(12) United States Patent  
Oledzki

(10) Patent No.: US 8,523,445 B2  
(45) Date of Patent: Sep. 3, 2013

(54) ACTIVE HYDROSTATIC BEARING, PARTICULARLY FOR INTERNAL COMBUSTION RECIPROCATING ENGINES, AND A FLUID HANDLING SYSTEM ASSOCIATED THEREWITH

(76) Inventor: Wieslaw Julian Oledzki, Bialystok (PL)

( * ) Notice: Subject to any disclaimer, the term of this patent is extended or adjusted under 35 U.S.C. 154(b) by 472 days.

(21) Appl. No.: 12/804,300

(22) Filed: Jul. 20, 2010

(65) Prior Publication Data

US 2012/0020597 A1    Jan. 26, 2012

(51) Int. Cl.
    *F16C 32/06* (2006.01)
(52) U.S. Cl.
    CPC ................................. *F16C 32/064* (2013.01)
    USPC .......................................... 384/118; 384/114
(58) Field of Classification Search
    USPC .................. 384/99, 100, 114, 118, 192, 199, 384/247, 250, 252, 253
    See application file for complete search history.

(56) References Cited

U.S. PATENT DOCUMENTS

| 2,459,826 | A | * | 1/1949 | Martellotti | 384/118 |
| 2,578,713 | A | * | 12/1951 | Martellotti | 384/118 |
| 2,938,756 | A | * | 5/1960 | Loeb | 384/118 |
| 3,208,395 | A | * | 9/1965 | Budzich | 91/489 |
| 5,769,545 | A | * | 6/1998 | Bently et al. | 384/118 |
| 6,142,672 | A | * | 11/2000 | Bently et al. | 384/118 |

* cited by examiner

*Primary Examiner* — James Pilkington  
*Assistant Examiner* — Richard Urbanski

(57) ABSTRACT

This invention relates to bearings, and more specifically is directed to active hydrostatic bearings destined for large heavily loaded reciprocating internal combustion engines, like ultra high compression ratio Diesel cycle engines, and homogeneous charge compression ignition (HCCI) and detonation engines working on stoichiometric fuel/air mixture. A fluid handling system therefore, method and apparatus are also disclosed.

4 Claims, 14 Drawing Sheets

ACTIVE HYDROSTATIC BEARING, PARTICULARLY FOR INTERNAL COMBUSTION RECIPROCATING ENGINES, AND A FLUID HANDLING SYSTEM ASSOCIATED THEREWITH

0. TECHNICAL FIELD OF THE INVENTION

This invention relates to bearings, and more specifically is directed to active hydrostatic bearings destined for large heavily loaded reciprocating internal combustion engines, like ultra high compression ratio Diesel cycle engines, and homogeneous charge compression ignition (HCCI) and detonation engines working on stoichiometric fuel/air mixture. A fluid handling system therefore, method and apparatus are also disclosed.

1. STATE OF THE ART AND BACKGROUND OF THE INVENTION

Internal combustion reciprocating engines (Diesel and Otto cycle), most common prime movers in use, are responsible for substantial percentage of total hydrocarbon fuels expenditure and environment pollution. Their overall efficiency, i.e. the percentage of the energy contained in the fuel converted into the useful work, is in the range of 25-54%, wherein the upper bound of this range is approached only by large stationary or marine ultra long stroke crosshead Diesel engines, (which in fact are compound heat machines comprising Diesel engine, turbocharger, supercharging air cooler and sometimes auxiliary power turbine), and average Diesel efficiency is merely ~40%, a poor figure in comparison with 70-75% overall efficiency originally assumed by its inventor in late $19^{th}$ century. It is well known that thermal efficiency of Diesel cycle rises as the compression ratio, maximum combustion pressure (now not exceeding 200 bar in special purpose engines and 140-153 bar in large stationary or marine two stroke Diesel engines, again much lower than 250 bar originally assumed by Rudolf Diesel), and the ratio $\rho$ of thermal energy released in isochoric combustion process to thermal energy released in isobaric combustion process rise, reaching 70-75% for compression ratio 25-30 and $\rho=1$, but this method for improving overall efficiency of real Diesel engines is obstructed by friction losses rapidly rising with loads of engine's mechanism. Moreover, engine mechanism's strength becomes a concern in ultra high compression ratio Diesel engines, with bearings being the weakest element of engine's structure.

The compression stroke of conventional Diesel engine is responsible for large mechanical energy consumption, which substantially diminishes engine's power density, and for diminished thermal and overall engine's efficiency. Thus internal combustion engines utilizing thermodynamic cycle with substantial combustion-driven increase of pressure are of particular interest, as those engines are capable of achieving high power density and very high thermal efficiency, and thus low specific fuel consumption. These engines are mainly homogeneous charge compression ignition (HCCI) and detonation engines working on stoichiometric fuel/air mixture. However, HCCI and detonation cycles utilizing stoichiometric fuel/air mixture develop extremely high maximum pressures and gradients of pressure (understood as a function of angle of rotation of engine's shaft), which can destroy the engine. Thus engine's strength, and particularly bearings capability to withstand extremely high specific loads and their ability to last for an economically reasonable period becomes a serious concern. Some engine's elements, e.g. crankshaft and connecting rod, can be made stronger just by increasing their transverse cross section. However, increased diameter of crankshaft journals causes points on the circumference of the journal travel at increased tangential velocity, which substantially increases bearing's loads. Moreover, the mass forces are increased, which additionally increases bearings loads. All these render the engine bearings prone to defects, and increased friction losses could nullify gains in thermal efficiency.

Bearings used in internal combustion engines are mainly plain (or rather fluid dynamic or hydrostatic) bearings and, at a much smaller scale, rolling bearings. Fluid bearings have important advantages over rolling bearings. The fluid bearing is just two smooth surfaces usually made by anti-friction metal, sometimes supplemented by seals to keep in the working fluid. Therefore they can be relatively cheap compared to rolling bearings with a similar load rating. Moreover most fluid bearings require little or no maintenance. Pumped hydrostatic bearing designs retain low friction down to zero speed and need not suffer start/stop wear. Fluid bearings, when run within a rated loads, generally have very low friction, far better than mechanical bearings, and often inherently add significant damping, which helps attenuate resonances at the gyroscopic frequencies of journal bearings. An important advantage of plain bearings in engines application is that they work well while subjected to shock loads met with in internal combustion engines, assuming these shock loads are not very high. Yet another advantage of fluid bearings is that they are typically quieter and smoother than rolling-element bearings.

On the other hand, plain bearings in engine application have serious disadvantages and limitations. First of all, their ability to withstand shock loads does not extend over extreme values met with in ultra high compression ratio Diesel engines, as well as HCCI and detonation engines working on stoichiometric mixture. Second, in this application, fluid bearings are subject to severe wear during start-up and shutdown, and substantial wear is also caused by hard combustion contaminants that bridge the oil film. Third, friction losses and therefore power consumption are typically higher than rolling bearings due to microscopic roughness of bearing surfaces. Fourth, fluid bearings can catastrophically seize under shock situations. Fifth, the half frequency whirl met with in fluid bearings is the bearing instability that generates eccentric precession which can lead to poor performance or life.

In contrast, a conventional rolling bearing requires many high-precision rollers and the inner and outer races are often complex shapes, making them difficult to manufacture and rising the first cost of a machine. Its shock resistance and ability to dampen vibrations are usually lesser then fluid bearings. Moreover, conventional rolling-element bearings usually have shorter life and require regular maintenance.

However rolling element bearings have also important advantages over plain ones. They are much less prone to defect when operated at high peripheral speeds, and their ability to bear high loads is greater. Moreover, rolling element bearings work much better under start-up and shutdown conditions, and generally work well in non-ideal conditions.

Under these circumstances, it is a very natural idea to merge plain (or rather hydrostatic) and rolling element bearing advantages into one design. The idea is also known from the prior art. Namely, the U.S. Pat. No. 4,605,317 to Mr. Francesco Bonaccorso, full text of which is incorporated herein by reference, discloses a bearing for supporting a load by the reaction force of a pressurized fluid, by the reaction force of a plurality of rollers in the absence of the pressurized fluid, or by a combined reaction force of the pressurized fluid and the bearing rollers. This bearing seems well suited for application in very high combustion pressure engines, although I am not aware of any experimental data supporting this opinion. However Bonaccorso bearing is a passive bearing, i.e. a bearing that is unable to dynamically compensate for impending shaft motion leading to rubbing of rotating and stationary elements. To be more precise, there is no active fluid handling system that can respond to rapidly changing loads of the shaft. Consequently, the bearing would work in the hybrid "pressurized fluid-rolling element"-mode of operation rather than in the preferable pure "pressurized fluid" mode of operation when loaded by cyclic shock loads typical for ultra high pressure internal combustion engines. Moreover, this bearing lacks simplicity of plain bearings.

The idea of an active fluid bearing is also present in the prior art. For example the U.S. Pat. No. 5,769,545 to Mr. Mr. Bently and Grant, full text of which is incorporated herein by reference, discloses a method and apparatus for determining shaft's position in a bearing and for providing pressurized fluid so as to restore coaxial position of the shaft and the circumscribing bearing bush. Unfortunately the method of Bently and Grant calls for excessively complicated equipment, and their fluid handling apparatus is likely to be slow in response to rapidly changing forces loading the shaft.

The U.S. Pat. No. 2,578,713 to Martellotti teaches a fluid bearing with valve-enhanced fluid flow differential applied to opposite fluid pockets encircling a shaft. However, in this design the valves are directly controlled by shaft's radial movement, which is certainly to small to effectively command the valves.

Recently invented Bently Pressurized Bearing (see http://www.bpb-co.com/), unlike conventional hydrodynamic bearings, uses full 360° lubrication and a fluid externally pressurized enough to force the lubricant to flow primarily along the shaft (forming an inherently stable axial support wedge), rather than the tendency of conventional low-pressure designs to pull fluid into rotational motion around the shaft (forming a circumferential support wedge which promotes instability). This technology seems to solve instability problems met with in ordinary hydrodynamic pressure and to be very promising for application in turbomachinery and other machines not subjected to very high shock loads. However, Bently bearing is a passive one and its ability to bear extremely high shock loads is a suspect.

It is clear that complicated and expensive bearing system would be acceptable only in highly loaded expensive machines destined for sustained operation, wherein friction losses are responsible for substantial portion of overall operating costs, and large stationary and marine engines are definitely machines of this type.

As is well known, large stationary and marine engines are destined for operating primarily at nominal (design) loads, and running costs related to operating such engines at nominal loads constitute a vast majority of overall running costs. Thus effectiveness of bearing system when the engine is operated at nominal loads is of greatest importance, while its performance at partial loads and start-up and shutdown conditions is much less significant for overall running costs.

However, marine engines must operate also at partial loads and at start-up and shutdown conditions, and such conditions are responsible for considerable wear of plain bearings of contemporary engines. Thus good performance of engine's bearing at partial loads and start-up and shut down conditions is also important for engine's durability, and therefore for overall life cost of the power plant.

An internal combustion engine, when operated at design conditions, is generally subject to predetermined cyclic loads. This fact allows for designing effective fluid handling system for generating in-bearing forces counteracting mass and gas forces.

2. SUMMARY OF THE INVENTION

Thus a principal object of the present invention is to provide a novel externally pressurized fluid bearing capable of bearing extremely high loads while retaining minimal internal friction.

Another principal object of the present invention is to provide an effective bearing system for supporting a shaft loaded with predetermined loads.

More specifically, it is the principal object of the present invention to provide an effective fluid bearing system destined for extremely high combustion pressure positive-displacement internal combustion engines.

Yet more specifically, it is an object of the present invention to provide an effective bearing method for extremely high combustion pressure positive displacement internal combustion engines destined to work primarily at nominal (design) loads.

Another object of the present invention is to provide a fluid handling method for instantenous responsing to changing forces acting on a shaft supported by the pressurized fluid.

It is yet another object of the present invention to provide a system utilizing the method as defined above that is instantenous in its response to changing forces acting on the shaft.

To be more precise, it is an object of the present invention to provide a bearing system comprising, in combination: a shaft, a bearing block circumscribing the shaft, said block having portal means directed toward the shaft, a generally incompressible pressurized fluid (typically a lubricating oil) passing through the portal means to provide a force supporting the shaft, a high pressure pump supplying the pressurized fluid to said portal means, and means to determine pressure and quantity of the fluid supplied to said portal means.

To be yet more specific, it is an object of the present invention to provide a method for determining a pressure of the pressurized fluid delivered to said portal means so as to generate in-bearing fluidic forces substantially balancing predetermined external forces loading the shaft, and a method for generating correction in-bearing fluidic forces balancing external random forces loading said shaft.

It is also an object of the present invention to provide an apparatus for delivering the pressurized fluid of predetermined pressure to said portal means so as to balance predetermined external forces loading the shaft, and an apparatus for generating correction in-bearing fluidic forces balancing external random forces loading said shaft.

These and other objects are achieved according to the instant invention by providing a pressurized fluid bearing with a plurality of oil pockets uniformly spaced about the circumference of the bearing and separated frome one another by lands, the surfaces of which lie in the circle of the internal surface of the bearing, said pockets being differentially fed with a pressurized lubricating oil of a predetermined pressure, said pressure being controlled by specific fluid handling system, so that to generate an in-bearing force balancing the external force loading the shaft. The fluid handling system according to the invention consists of a high pressure pump, a plurality of camshaft-regulated control valves, through which the lubricating oil of required pressure is supplied to said oil pockets of the bearing so as to substantially balance predetermined external forces loading the shaft, and a plurality of auxiliary control valves destined for generating a correction fluid pressure supplementing the oil pressure substantially balancing the predetermined external forces. A profile of cams of the camshaft determine the pressure of the lubricating oil.

Roughly speaking, the method for generating in-bearing forces balancing predetermined external forces loading the shaft according to the instant invention consist in determining a force $F(\phi)$, loading the shaft at nominal conditions, as a function of the angle $\phi$ of rotation of the shaft, decomposing said force $F(\phi)$ into the sum of other forces $F_i(\phi)$ (typically i=x,y and $F_x(\phi)$, resp. $F_y(\phi)$, is the "horizontal" resp. "vertical" component of $F(\phi)$, however, in the case $F(\phi)$ is the resultant force of some other forces loading independently the shaft in question, it may be reasonable to decompose these component forces independently), decomposing each function $F_i(\phi)$ into the difference of at least two convex functions $F_{ij}(\phi)$, and providing cams $CS_{ij}$, where the profile of cam $CS_{ij}$ is given in the polar reference system ($\phi$, r) by the function $r_{ij}(\phi - \alpha_{ij}) = CF_{ij}(\phi)$ for some universal constant C and suitable phases $\alpha_{ij}$. The number of functions $r_{ij}(\phi)$ corresponds to the number of fluid pockets, and the cam $CS_{ij}$ controls its respective valve $V_{ij}$ through which the oil is fed into its respective oil pocket. The cams $CS_{ij}$ are placed on at least one camshaft rotating in unison with the shaft supported by the bearing, where the cam $CS_{ij}$ is phased relative the main shaft by the angle $\alpha_{ij}$ chosen so as to balance the inevitable delay of response of the fluid handling system to changing external forces. A pressure $p_{ij}$ at the exit of valve $V_{ij}$ generates the in-bearing force—$F_{ij}$ acting on the main shaft through its respective oil pocket. The reason for decomposing functions $F_i(\phi)$ into the difference of convex functions is that the function $F_i(\phi)$ is usually not convex, and therefore is not well suited to serve as a profile of a cam.

The method for generating in-bearing fluidic forces balancing random (not predictable) forces loading the shaft consists in measuring the instantaneous eccentricity of the shaft relative bearing's block, amplifying a signal generated by said eccentricity, and letting said amplified signal to command the auxiliary control valves.

These and other features and advantages of the invention will become clear as the specification will proceed.

3. BRIEF DESCRIPTION OF THE DRAWINGS

4. DETAILED DESCRIPTION OF PREFERRED EMBODIMENTS

In the appended drawings like reference symbols denote like parts throughout the various drawing figures.

Roughly speaking, the present invention provides a dynamically balanced fluid bearing system including a fluid handling system (FIGS. 1, 2, 3, 4, 9).

Figure 6:
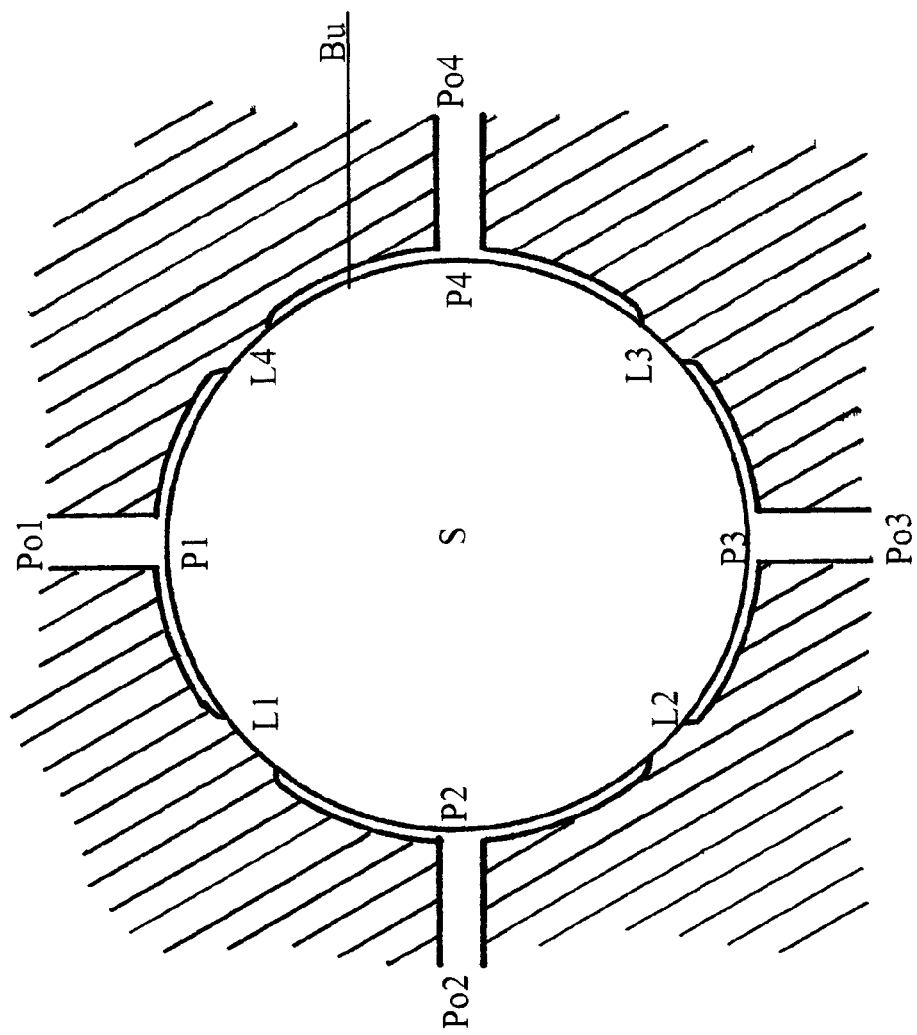
FIG. 6 is a transverse cross section of a fluid bearing according to the present invention, taken along the line 6-6 in FIG. 8.
Figure 8:
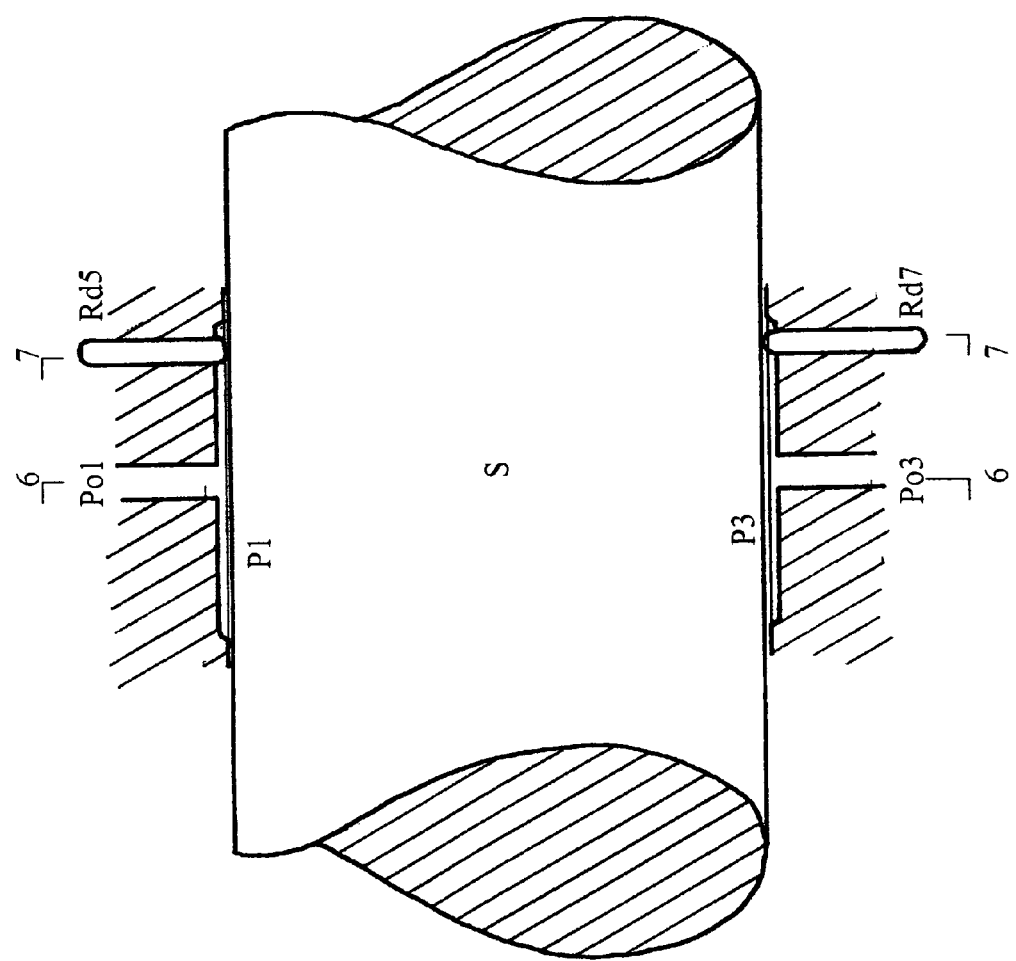
FIG. 8 is a longitudinal cross section of a fluid bearing according to the present invention.
Figure 9:
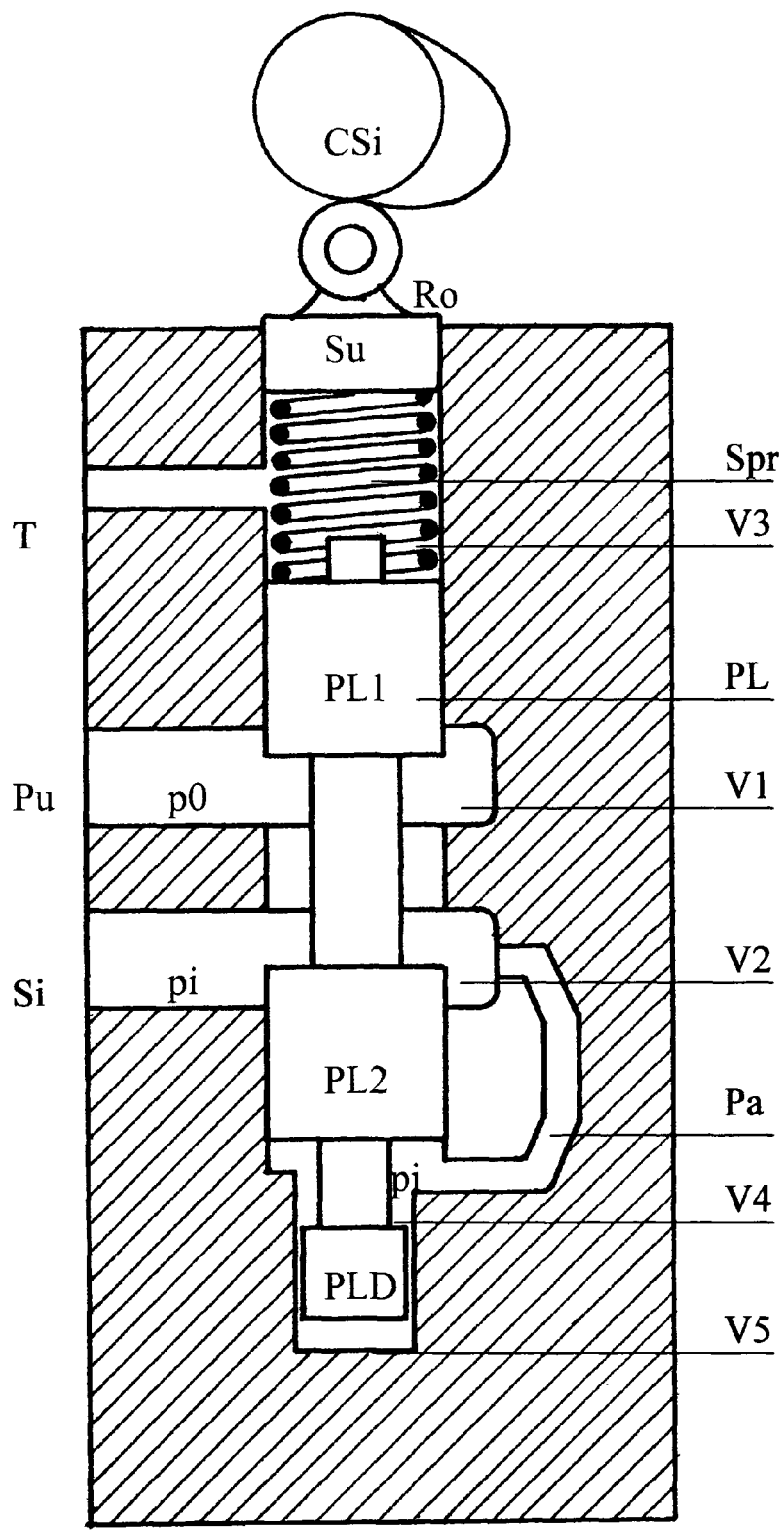
FIG. 9 is a cross section of a typical control valve used in the fluid handling system according to the present invention.

Referring to FIGS. 6 and 8, the bearing according to the invention has a bush Bu, and four uniformly spaced oil pockets P1, P2, P3, P4, placed along the central circle of the internal circular surface of bush Bu. Leading to their respective oil pockets P1, P2, P3 and P4 there are four ports Po1, Po2, Po3 and Po4, such that fluid forces may be applied to a rotor shaft S of a machine, typically a large internal combustion engine. At the end of each pocket there are lands L1, L2, L3, L4, the surfaces of which are flush with the inner circular surface of bush Bu. Lands L1, L2, L3, L4 define four leakproof sectors S1, S2, S3, S4 (FIGS. 1, 2, 3, 4). The role of the ports Po1, Po2, Po3 and Po4 is to supply pressurized oil to their respective leakproof sectors S1, S2, S3 and S4. Moreover, two pairs of mutually opposite oil pockets (P1, P3) and (P2, P4) provide a two dimensional coordinate system for decomposing the fluidic in-bearing forces applied to shaft S. Placed in proximity to bush Bu there are four seats Se1, Se2, Se3, Se4 receiving slidingly their respective rods Rd1, Rd2, Rd3, Rd4.

Figure 1:
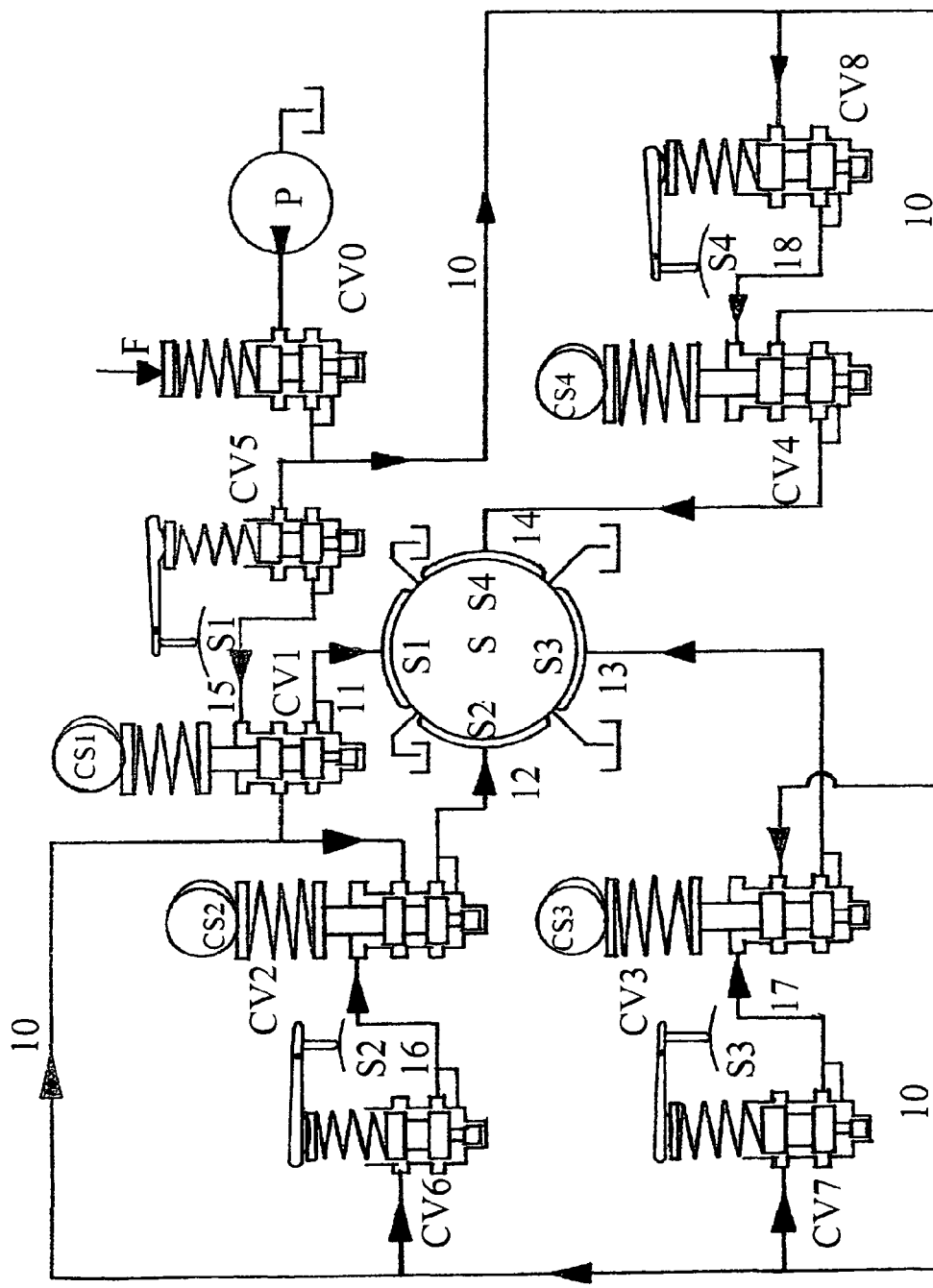
FIG. 1 is a simplified schematic view of one embodiment of the fluid handling system according to the present invention.
Figure 10:
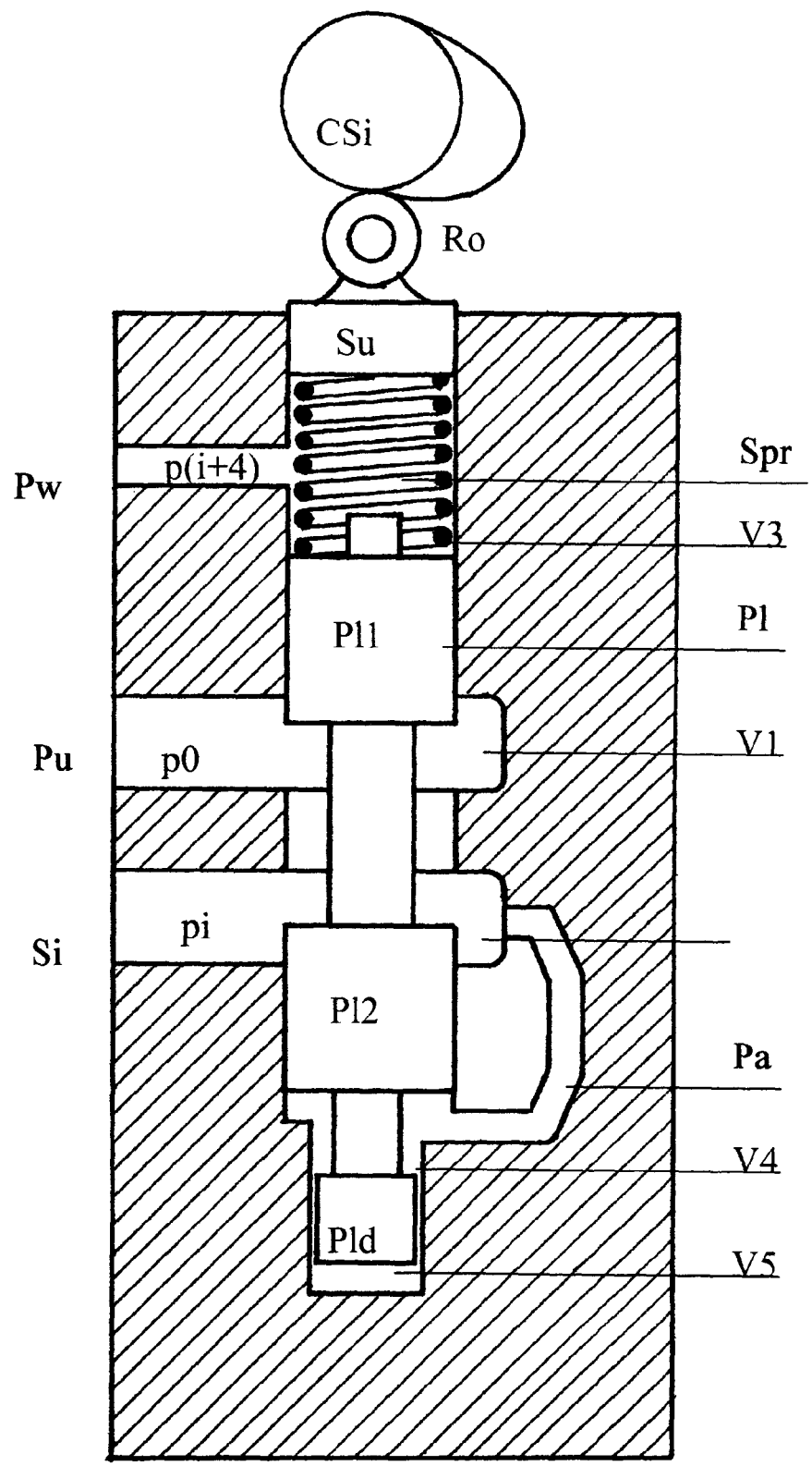
FIG. 10 is a cross section of another control valve used in the fluid handling system according to the present invention.

Now, referring to FIGS. 1, 6, 7, 8, 9, one preferred embodiment of the fluid handling system according to the present invention, destined to support a shaft S loaded with periodically changing external loads, where the period of oscillation of said loads equals the period of rotation of said shaft (as it is in the case of the shaft of a two-stroke engine) consists of a pressurized fluid bearing B as described above, a high pressure pump P, a main reservoir T, cooling pump, low pressure filters, high pressure filter, heat exchanger, pressure reducing (or rather constant pressure) valve CV0, return reservoir, return pump, four primary control valves CV1, CV2, CV3 and CV4, four cams CS1, CS2, CS3 and CS4 placed on a common camshaft, and four secondary control valves CV5, CV6, CV7 and CV8. Moreover, the camshaft is driven by the main shaft S through a 1:1 transmission ratio gear transmission (not shown). Valve CV0 placed immediately downstream the high pressure pump is a pressure reducing valve loaded with a constant force F0, e.g. generated by a spring. Its role is to keep constant predetermined pressure p0 in the delivery pipe 10. All the valves CV1, CV2, . . . , CV7, CV8 (see FIGS. 1, 9, 10) are essentially pressure reducing ("constant pressure") valves that includes plungers mounted for movement along the longitudinal axis of the valve; the plungers are loaded with forces generated by springs Spr that are long in comparison with the maximum stroke of plunger PL (so that plunger's movement does not affect the spring force). Spring Spr is supported at its one end on a plunger PL, and its other end rests on a cam Csi, i=1, 2, 3, 4, through a support Su and a roller Ro. Fixedly attached to plunger PL there is a damping plunger PLD. The sole role of damping plunger PLD is to dampen vibrations of main plunger PL. Defined by beads PL1, PL2 and recesses of plungers PL and PLD and bore chambers placed in the valve body there are five chambers V1, V2, V3, V4, and V5. Plunger PL is extra fine fitted in the valve body, while damping plunger PLD is coarse clearance fitted in its chamber V5, thus providing fluid communication between chambers V4 and V5 through a narrow annular orifice between the damping plunger and internal circular wall of chamber V5. A fluid passage Pa provides fluid communication between bore chambers V2 and V4. A pressurized fluid under a delivery pressure p0 (determined by valve CV0) is supplied to valve Cvi, i=1, 2, ..., 8, through a portal Pu, and exits the valve through an exit portal, labeled Si for i=1, 2, 3, 4, under a downstream pressure pi<p0, i=1, 2, ..., 8. Port Pw of primary control valve CVi, i=1, 2, 3, 4, see FIGS. 1, 10, is in permanent fluid communication with the exit of one secondary control valve CV(i+4). Thus the equation of instantaneous equilibrium of the plunger PL of control valves CVi, i=1, 2, 3, 4, reads as follows: $p_i \times A_2 - p(i+4)A_1 = F(\beta)$, where $A_2$ is the area of the lower surface of bead PL2 of plunger PL, $A_1$ is the area of the upper surface of bead PL1 of plunger PL, and $F(\beta)$ is the force loading spring Spr at the angle $\beta$ of rotation of camshaft CSi. Instantaneous force $F(\beta)$ is determined by the radius $r_i(\beta)$ of cam CSi according to the approximate equation $F(\beta) = -k r_i(\beta)$, where k is the spring constant, and the minimum of radiuses $r_i(\beta)$ is assumed to be large in comparison with the maximum plunger stroke. Therefore the valve gives at its exit substantially the pressure $p_i = (F(\beta)+p(i+4)A_1)/A_2 = p_i(\beta)$, encoding the combination of the predetermined and random forces loading the shaft (see, the discussion below; minor random perturbations are not taken into account; presence of damping plunger PLD and assumption that spring Spr is long in comparison with the maximum plunger's stroke justifies this negligence). Radius $r_i(\beta)$ and geometric parameters of plunger PL and sectors Si are chosen so that the pressure $p_i(\beta)$ generates the required instantaneous force in the sector Si of bearing B, see the discussion below. Damping plunger PLD forces the oil through the narrow annular orifice circumscribing it, and generates an oil flow between chambers V4 and V5, thus damping plunger vibrations and stabilizing pressure $p_i(\beta)$.

Figure 12:
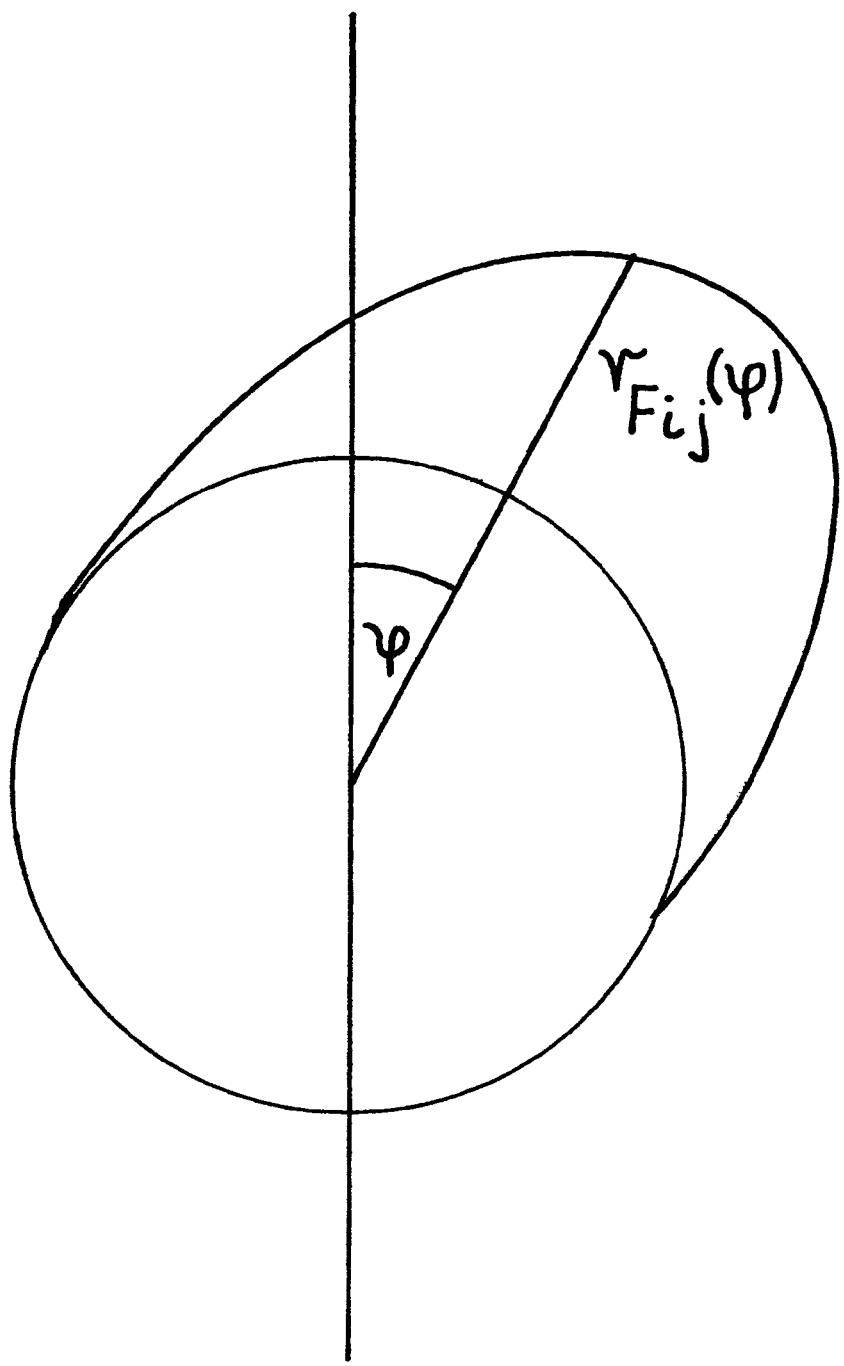
FIG. 12 is a side view of a typical cam used to control a valve of the fluid control system according to the invention.

In accordance with the method of the present invention for generating required in-bearing fluidic forces counteracting predetermined external forces loading the shaft as described in section 2, the total force loading the shaft at nominal conditions (e.g. the resultant force of the mass force and gas force in the case of internal combustion engine) is represented by a function $F(\varphi)$ of the angle $\varphi$ of rotation of the shaft. Said force $F(\varphi)$ is decomposed into the sum of two forces $F_x(\varphi)$ and $F_y(\varphi)$, respectively the "horizontal" and "vertical" component of $F(\varphi)$. Next each of the forces $F_x(\varphi)$ and $F_y(\varphi)$ is represented as the difference of two convex functions: $F_x(\varphi) = F_2(\varphi) - F_4(\varphi)$, $F_y(\varphi) = F_1(\varphi) - F_3(\varphi)$ (recall that any differentiable function can be represented as the difference of two convex functions). Cams CSi, i=1, 2, 3, 4 (see FIG. 12), are provided with the profile given in the polar reference system ($\varphi$, r) by the function $r_i(\beta = \varphi - \alpha_i) = C_i F_i(\varphi)$ for some universal constant $C_i$ and suitable phases $\alpha_i$. Cam CSi controls its respective valve Vi through which the oil is fed into its respective oil pocket P1, P2, P3, P4 through pipe 11, 12, 13, 14 respectively. Cams CSi are placed on at least one camshaft rotating in unison with the shaft supported by the bearing, where the cam CSi is phased relative the main shaft by the angle $\alpha_i$ chosen so as to counteract the inevitable delay of response of the fluid handling system to changing external forces. Constants $C_i$, k, parameters of valves CVi, i=0, 1, 2, ..., 7, 8 and phases $\alpha_i$ are chosen so that pressure pi at the exit of primary control valve CVi, i=1, 2, 3, 4, generates approximately the in-bearing force $-F_i$ acting on the main shaft through its respective oil pocket and balancing its respective predictable external component force. Thus a major (predictable) portion of the external force loading the shaft is balanced by the fluid in-bearing force generated by the fluid handling system described above, while minor random forces loading the shaft are balanced by correction forces controlled by the secondary control valves, as described below.

Secondary control valves CV5, CV6, CV7, CV8 (FIGS. 7, 9) have similar construction to that of the primary control valves, however tension of their springs is controlled in a different way. Namely, this embodiment of the fluid handling system according to the present invention employs two pairs of XY position sensors PS5, PS6, PS7 and PS8, to measure the static and dynamic motion of the shaft relative the bearing and to generate a correction signal, and signal amplifiers that transform the signal to the spring tension that determines the pressure at the exit of the secondary control valves. In this embodiment of the invention, the position sensors are just rods Rd5, Rd6, Rd7, Rd8 received slidingly in their respective seats Se1, Se2, Se3, Se4, and defining a XY reference system (see FIGS. 1, 2, 3, 4, 7; a more elaborate sensors are also within the scope of the present invention). One end of said rods Rdi slides over the shaft, and the other end is connected with the "short" arm of a lever Lei, i=5, 6, 7, 8, serving as the signal amplifier. The "long" arm of said lever Lei supports the spring of secondary control valve CV(i+4). Thus each motion sensor transfers shaft's motion relative the bearing to lever's Lei motion, and "long" arm of said lever controls the tension of spring Spr establishing the momentary valve's setting. The equilibrium equation of the plunger of the secondary control valves reads as follows: $p(i+4)A_2 = F$, where $p(i+4)$ is the pressure at the exit of said control valve, $A_2$ is the area of the lower surface of bead PL2 of plunger PL, and F is the momentary spring force loading the plunger. Consequently, secondary control valve CV(i+4) gives at its exit the pressure $p(i+4)$ that encodes a component of a random momentary force loading the shaft and shaft's momentary position relative bushing Bu. The exit of secondary control valve CV(i+4) is in a permanent fluid communication with chamber V3 of primary control valve CVi; this allows primary control valve CVi to produce at its exit a pressure that encodes the combination of the predictable and random component of the force loading the shaft (see the equilibrium equation for the plunger of the primary control valves above).

Figure 2:
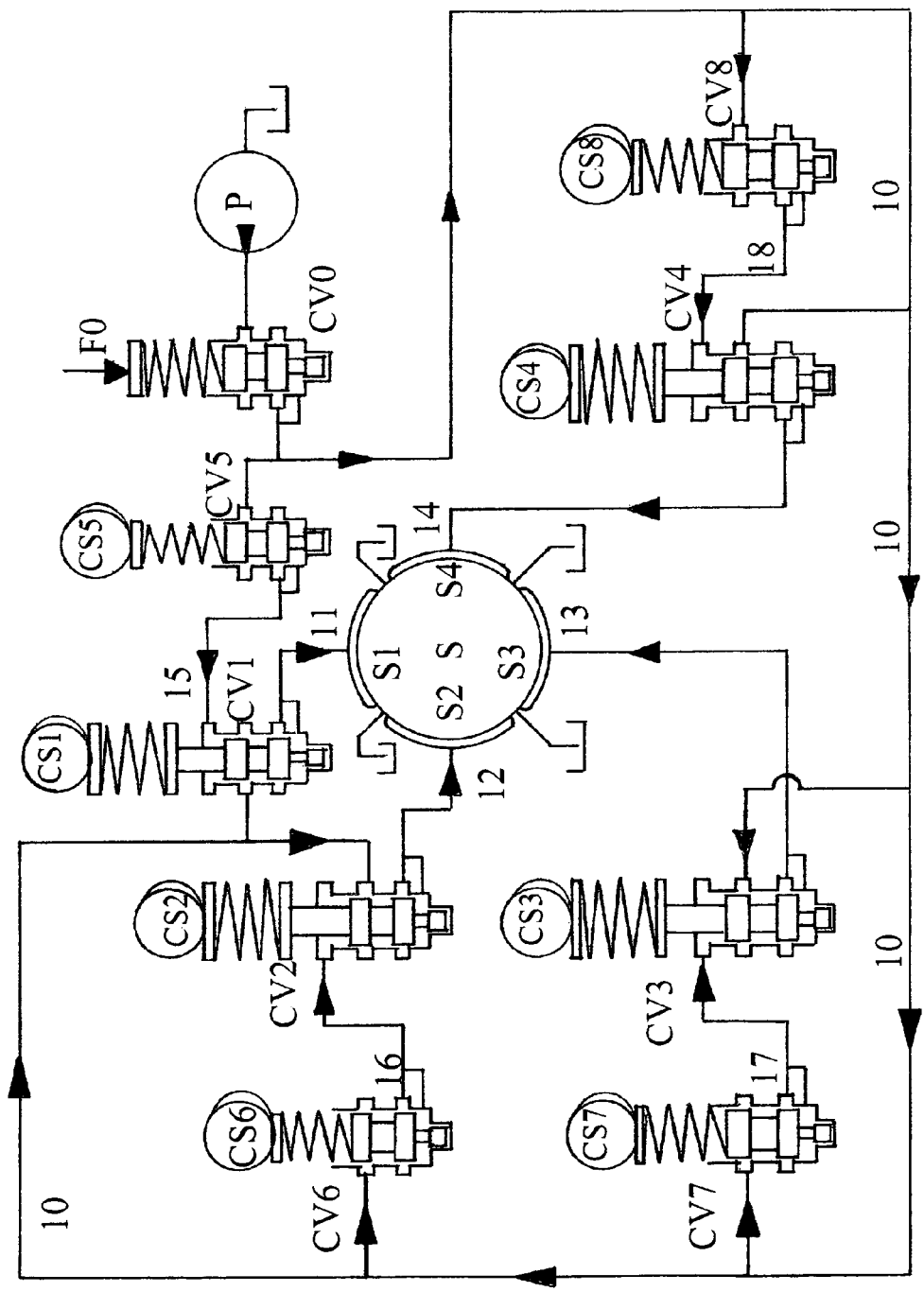
FIG. 2 is a simplified schematic view of another embodiment of the fluid handling system according to the invention.
Figure 3:
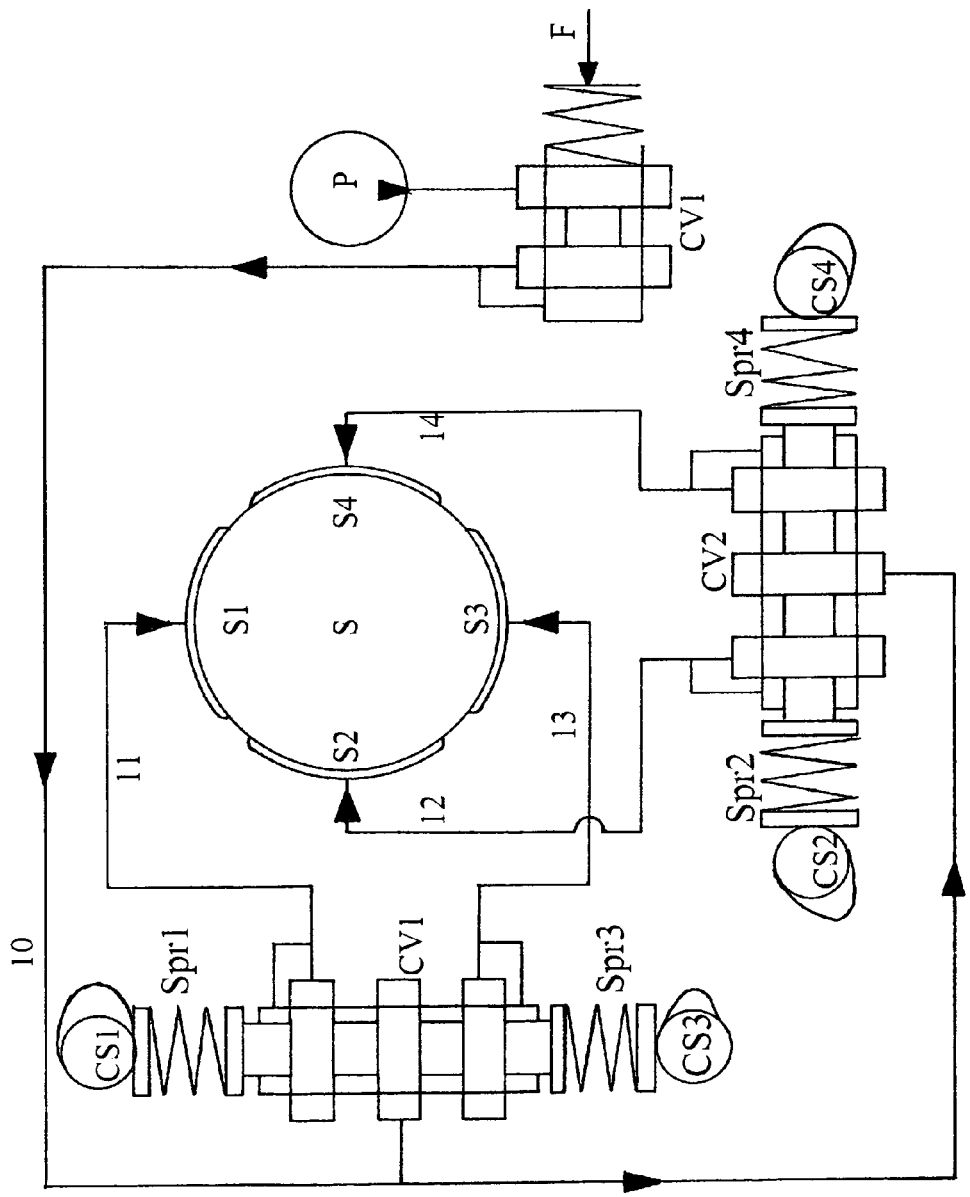
FIG. 3 is a simplified schematic view of yet another embodiment of the fluid handling system according to the invention.

Another preferred embodiment of the invention, typically destined to support crankshafts of internal combustion engines, is depicted in FIG. 2. It is similar to above-described embodiment, the only major differences beeing an alternative destination of secondary control valves CV5, CV6, CV7 and CV8, presence of four additional cams CS5, CS6, CS7 and CS8, providing instantaneous setting of their respective secondary control valves, absence of a system for compensating random forces loading the shaft, and, in the case of four-stroke engines, an additional camshaft (not shown) rotating two times faster that the main shaft (see FIG. 2). These alterations results from a different application of the general method of the present invention. Namely, external force F loading the shaft is represented as the sum of two other forces, typically, in the case of application to an internal combustion engine, the mass force FM and the gas force FG, and these forces are treated separately, rather than being combined into one resultant combination of cams. Thus the force FM (resp. FG) is represented by a function $FM(\varphi)$ ($FG(\varphi)$) of the angle φ of rotation of the shaft. Said force FM(φ) is decomposed into the sum of two forces $FM_x(φ)$ and $FM_y(φ)$, respectively the "horizontal" and "vertical" component of F(φ). Next, each of the forces $FM_x(φ)$ and $FM_y(φ)$ is represented as the difference of two convex functions: $FM_x(φ)=F_2(φ)-F_4(φ)$, $FM_y(φ)=F_1(φ)-F_3(φ)$; similarly, force FG(φ) is decomposed into the sum of its "horizontal" and "vertical" components $FG_x(φ)$ and $FG_y(φ)$, and next each of the forces $FG_x(φ)$ and $FG_y(φ)$ is represented as the difference of two convex functions $F_6(φ)-F_8(φ)$, and $F_5(φ)-F_7(φ)$ respectively. Cams Csi, i=1, 2, . . . , 8, are formed in the same way as in the case of the first embodiment to represent functions $-F_i(φ)$. The fluid handling system is fed by a high pressure pump through a constant pressure valve CV0. Control valves CV5, CV6, CV7 and CV8, destined to generate forces $-F_5(φ)$, $-F_6(φ)$, $F_7(φ)$, $F_8(φ)$ in the sectors S1, S2, S3 and S4 respectively, are of precisely the same construction as in the previous embodiment, the only difference being the presence of cams CS5, CS6, CS7 and CS8 driving their respective secondary control valves. Control valves CV1, CV2, CV3 and CV4 are destined to represent forces $-F_1(φ)+F_5(φ)$, $-F_2(φ)+F_6(φ)$, $-F_3(φ)+F_7(φ)$, and $-F_4(φ)+F_8(φ)$ respectively, therefore their construction slightly differs from that of other control valves. Namely (see FIG. 10), all the valves CV1, CV2, CV3, CV4 supplying the sectors S1, S2, S3 and S4 of the bearing through their respective pipes 11, 12, 13 and 14, are provided with a third portal Pw to combine forces $-F_1(φ)$ and $F_5(φ)$, $-F_2(φ)$ and $F_6(φ)$, $-F_3(φ)$ and $F_7(φ)$, and $-F_4(φ)$ and $F_8(φ)$ respectively. Cams CS1, CS2, CS3, and CS4 represent forces $-F_1(φ)$, $-F_2(φ)$, $F_3(φ)$ and $F_4(φ)$ respectively, as it was described above. Exit of valve CV5, CV6, CV7 and CV8 is connected via its respective pipe 15, 16, 17, 18, with port Pw of control valve CV1, CV2 CV3 and CV4 respectively (FIG. 2). Therefore the equilibrium equation for the plunger of valve Cvi, i=1, 2, 3, 4, reads $p_i \times A = F(β) + p_{i+4} \times A_1$, where A is the area of the lower surface of bead PL2 of plunger PL, $A_1$ is the area of the upper surface of bead PL1 of plunger PL, and F(β) is the force loading spring Spr at the angle β of rotation of camshaft CS1, and $p_i$ is the pressure at the exit of valve Cvi. Thus valve CVi at its exit Si generates a pressure pi which encodes force $-F_i(φ)+F_{i+4}(φ)$, I=1, 2, 3, 4. Again spring constants, parameters of valves CVi, i=1, 2, 3, 4 and phases $α_i$ are chosen so that pressure $p_i$ at the exit of valve Vi generates the in-bearing force $-F_i(φ)+F_{i+4}(φ)$ acting on the main shaft through sector Si, thus balancing its respective component of the external force, as required.

In the case of two-stroke engine the period of both the forces FM and FG equals 360°, thus all the cams Csi, i=1, 2, . . . , 8 can be placed on a common camshaft, which rotates in unison with the main shaft. In the case of four stroke engine, the period of the gas force equals 720°, therefore the cams Csi, i=5, 6, 7, 8, should be placed on a separate camshaft, which rotates two times slower that the main shaft.

Another preferred embodiment, destined to support a crankshaft of a large two-stroke engine shares a general scheme with the second preferred embodiment described above, but utilizes different decomposition of the mass force FM loading engine's crankshaft (see FIG. 2). Namely, force FM is decomposed into the first order force FM1 having the period of 360°, and the second order force FM2 having the period of 180°. Next force FM1 is combined with gas force FG (having the same period as force FM1) into one resulting force, which in turn is decomposed into its "horizontal" and "vertical" components. Both the components are presented as difference of two convex functions, say F2-F4 and F1-F3, and said functions are represented by cams CS1, CS2, CS3 and CS4 as described above. Force FM2 is decomposed into its "horizontal" and "vertical" components, each of the components is presented as the difference of two convex functions, say F6-F8 and F5-F7, which in turn are represented by cams CS5, CS6, CS7 and CS8. Control valves CV5, CV6, CV7 and CV8 give at their exits pressures encoding forces -F5, -F6, F7 and F8 respectively, while control valves CV1, CV2, CV3 and CV4 give at their exits pressures encoding forces -F1-F5, -F2-F6, -F3+F7 and -F4+F8 respectively. Cams CS5, CS6, CS7 and CS8 are placed on a separate camshaft (not shown) rotating two times faster than the main shaft. Otherwise the whole system is the same as that in embodiment 2.

FIGS. 3 and 6, 8, 11, 12, illustrate yet another (fourth) preferred embodiment of the present invention. This embodiment, destined to support a shaft loaded with predetermined periodically changing external loads, where the period of oscillation of said loads is a multiple of the period of rotation of said shaft, consists of a pressurized fluid bearing B as described above, a high pressure pump P, a main reservoir T, cooling pump, low pressure filters, high pressure filter, heat exchanger, pressure reducing (or rather constant pressure) valve CV0, return reservoir, return pump, and only two control valves CV1, CV2, and four cams CS1, CS2, CS3 and CS4 placed on a common camshaft. Moreover, the camshaft is driven by the main shaft S through a 1:n (for some integer n) transmission ratio gear transmission (not shown). Valve CV0 placed immediately downstream the high pressure pump P is a pressure reducing valve loaded with a constant force F0, e.g. generated by a spring. Its role is to keep constant predetermined pressure p0 in the delivery pipe 10. Both the valves CV1, CV2 (see FIGS. 11, 12) are essentially constant differential pressure valves with plungers loaded with forces generated by springs Spr(i) and Spr(i+2) that are long in comparison with the maximum stroke of plunger PL, so that plunger's movement does not affect the spring force. Spring Spr1 (respectively Spr3, see FIG. 12) is supported at its one end on a plunger PL, and its other end rests on a cam Cs1 (resp. CS3) through a support Su.

Defined by beads PL0, PL1, PL3 and recesses of plunger PL and bore chambers placed in the valve body there are four chambers V1, V2, V3, and V4. Plunger PL is extra fine fitted in the valve body. A fluid passage Pa1 provides fluid communication between bore chambers V1 and V2 thus equalizing the pressure in said two chambers, and a fluid passage Pa2 provides fluid communication between bore chambers V3 and V4, equalizing the pressure in the two chambers. A pressurized fluid under a delivery pressure p0 (determined by valve CV0) is supplied to valve CV1 through a portal Pu, and exits the valve through portals S1 and S3 under downstream pressures p1<p0, and p3<p0. The equation of instantaneous equilibrium of the plunger PL reads as follows: $p_1 \times A_1 + F_1(β) = p_2 \times A_2 + F_3(β)$, where A1 is the area of the upper surface of bead PL1 of plunger PL, A2 is the area of the lower surface of bead PL2 of plunger PL, $F_1(β)$ is the force loading spring Spr1 at the angle β of rotation of camshaft CS1, and $F_3(β)$ is the force loading spring Spr3 at the angle β of rotation of camshaft CS3. Instantaneous force $F_i(β)$ is determined by the radius $r_i(β)$, i=1, 3, of cam CSi according to the approximate equation $F(β)=-kr_i(β)$, where k is the spring constant, and the minimum of radiuses $r_i(β)$ is assumed to be large in comparison with the maximum plunger stroke. Therefore the valve gives at its exits S1, resp. S3, substantially the pressure $p_1=p_1(β)$, respectively $p_3=p_3(β)$, where the following equation holds: $p_1-p_3=(F_3(β)-F_1(β))/A=p_1(β)-p_3(β)$, since $A_1=A_2=A$ (where minor random perturbation are not taken into account; assumption that spring Spr is long in comparison with the maximum plunger's stroke justifies this negligence). Radius $r_i(\beta)$ and geometric parameters of plunger PL and sectors Si are chosen so that the pressure $p_i(\beta)$ generates the required instantaneous force in the sector Si of bearing B. A damping plunger for damping vibrations and stabilizing pressures $pi(\beta)$ can be attached to the main plunger as in the previous embodiments. Control valve CV2 is constructed precisely in the same way as control valve CV2, and generates at its exits pressures $p_2=p_2(\beta)$ and $p_4=p_4(\beta)$, where $p_2-p_4=(F_4(\beta)-F_2(\beta))/A=p_2(\beta)-p_4(\beta)$.

In accordance with the method of the present invention for generating required in-bearing fluid forces counteracting predetermined external forces loading the shaft as described in section 2, the total force loading the shaft at nominal conditions (e.g. the resultant force of the mass force and gas force in the case of internal combustion engine) is represented by a function $F(\phi)$ of the angle $\phi$ of rotation of the shaft. Said force $F(\phi)$ is decomposed into the sum of two forces $F_x(\phi)$ and $F_y(\phi)$, respectively the "horizontal" and "vertical" component of $F(\phi)$. Next each of the forces $F_x(\phi)$ and $F_y(\phi)$ is represented as the difference of two convex functions: $F_x(\phi)=F_2(\phi)-F_4(\phi)$, $F_y(\phi)=F_1(\phi)-F_3(\phi)$. Cams CSi, i=1, 2, 3, 4 (see FIGS. 11, 12), are provided with the profile given in the polar reference system $(\phi, r)$ by the function $r_i(\beta=\phi-\alpha_i)=C_iF_i(\phi)$ for some universal constants $C_i$ and suitable phases $\alpha_i$. Cams CSi and CS(i+2), i=1, 2, control their respective valve Vi through which the oil is fed into its respective pair of oil pockets P1 and P3, and P2 and P4, through pipes 11, 13, and 12, 14 respectively. Cams CSi are placed on at least one camshaft rotating in unison with the shaft supported by the bearing, where the cam CSi is phased relative the main shaft by the angle $\alpha_i$ chosen so as to counteract the inevitable delay of response of the fluid handling system to changing external forces. Constants $C_i$ and k, parameters of valves CVi, i=0, 1, 2, and phases $\alpha_i$ are chosen so that pressures pi and p(i+2) at the exits of valve CVi, generates the in-bearing force $\pm F_i$ (approximately) acting on the main shaft through its respective oil pocket and balancing its respective external component force. Thus the main (predictable) portion of the external forces $F_x(\phi)=F_2(\phi)-F_4(\phi)$ and $F_y(\phi)=F_1(\phi)-F_3(\phi)$ loading the shaft is balanced by the fluidic in-bearing forces generated by the fluid handling system described above.

Figure 4:
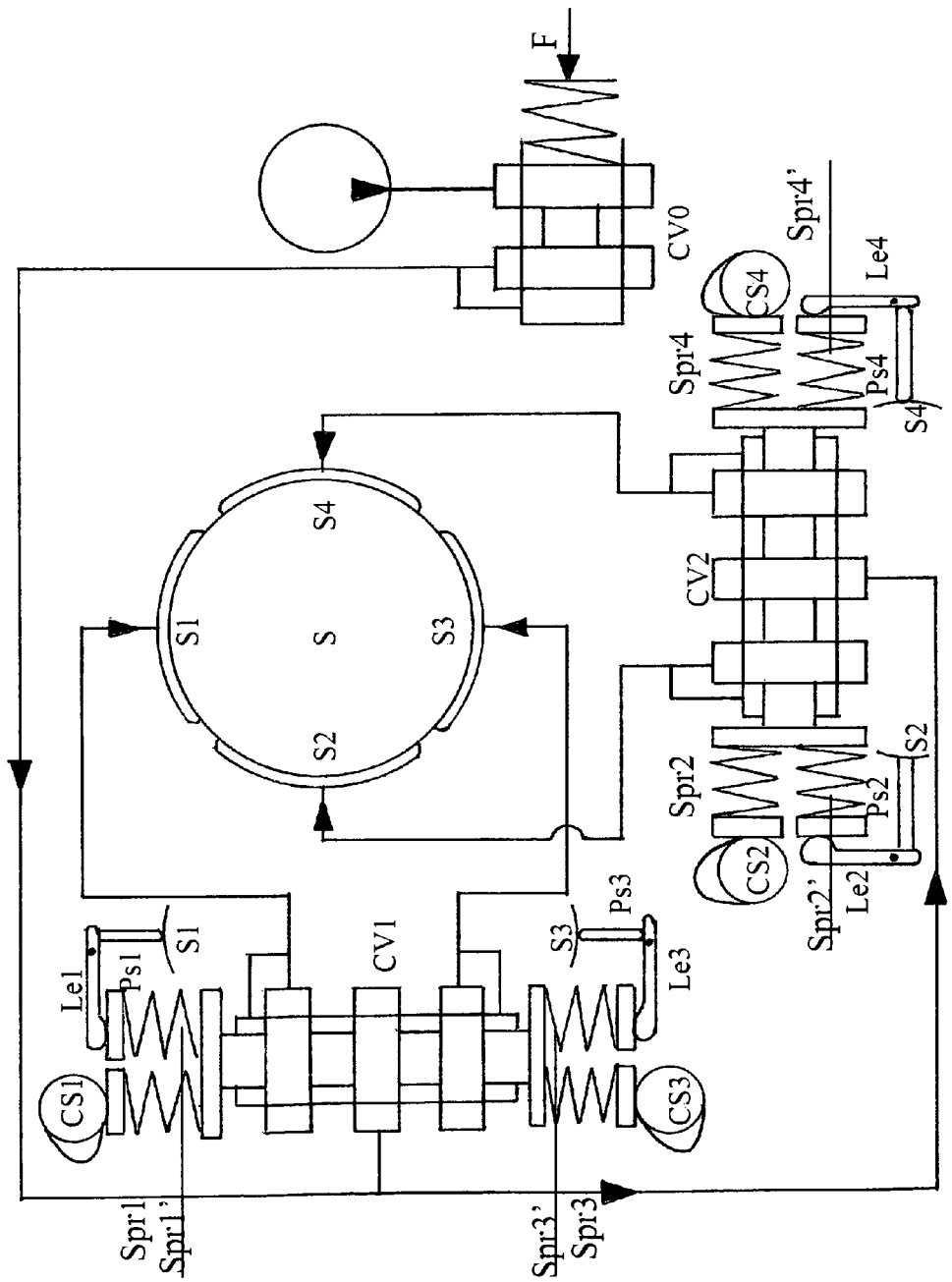
FIG. 4 is a simplified schematic view of a more elaborate variant of the embodiment illustrated in FIG. 3.
Figure 5:
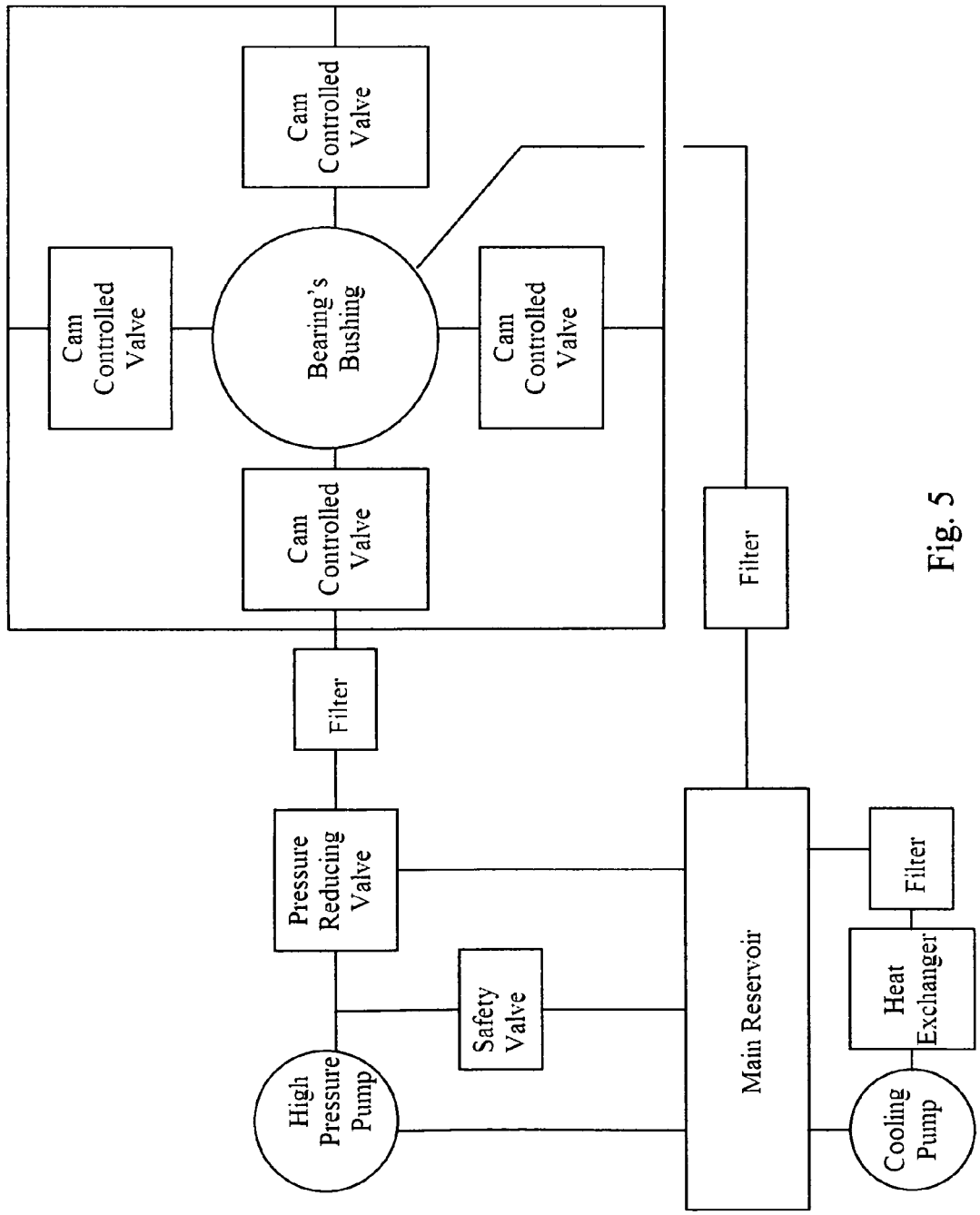
FIG. 5 is a general scheme of the hydrostatic bearing system according to the present invention.
Figure 7:
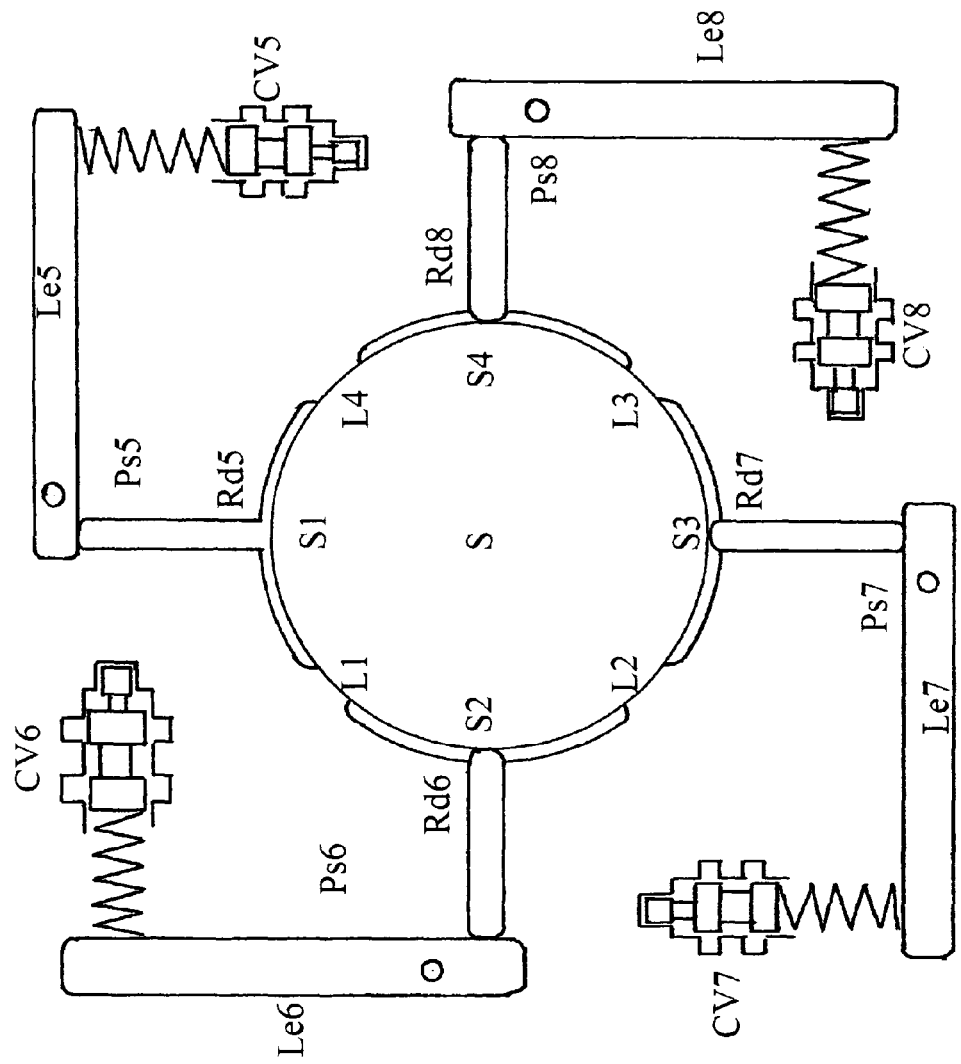
FIG. 7 is a transverse cross section of a fluid bearing according to the present invention, taken along the line 7-7 in FIG. 8.
Figure 11:
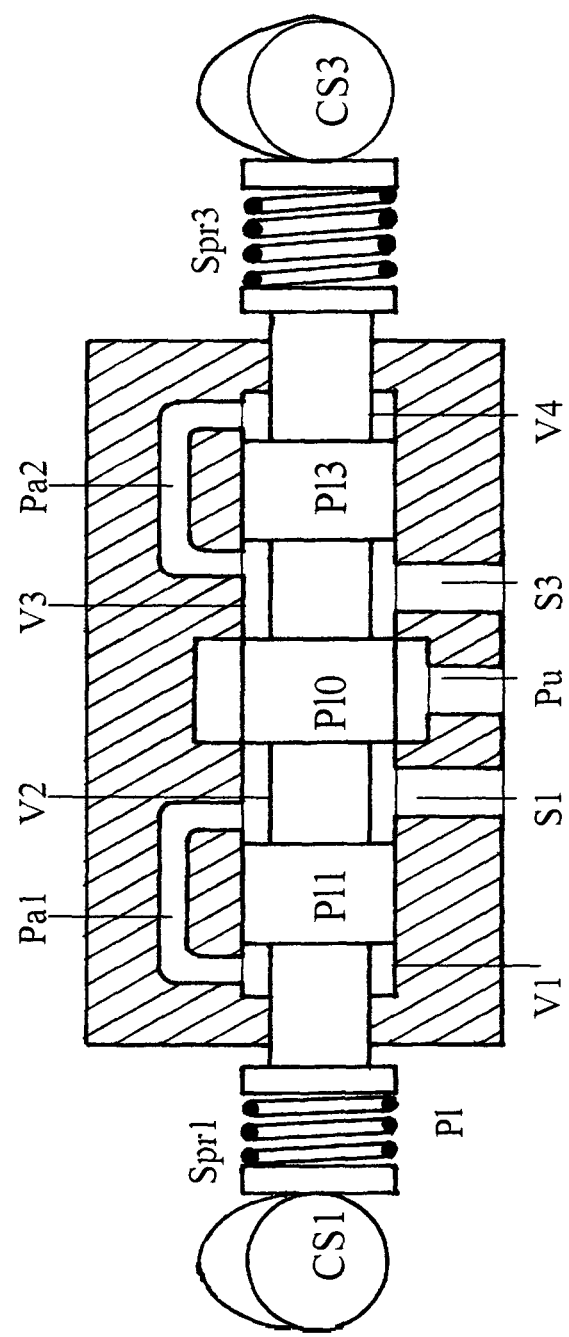
FIG. 11 is a cross section of yet another control valve used in the fluid handling system according to the present invention.

The fifth preferred embodiment of the present invention is similar to the previous one, the only difference being the presence of a system for compensating random forces loading the main shaft similar to the analogous system of embodiment 1 (see FIGS. 4, 7, 11). Thus there are two pairs of XY position sensors Ps1, Ps3, Ps2, and Ps4, similar to those used in the embodiment 1 described above, destined to detect momentary position of the shaft relative bearing's bushing and to affect instantaneous setting of the control valves CV1 and CV2. In this embodiment of the invention, the position sensors are just rods Rd1, Rd3, Rd2, and Rd4 received slidingly in their respective seats Se1, Se3, Se2, Se4, and defining a XY reference system (see FIGS. 4, 7). One end of said rods Rdi slides over the shaft, and the other end is connected with the "short" arm of a lever Lei, i=1, 2, 3, 4, serving as the signal amplifier. The "long" arm of said lever Le1, Le2, Le3, Le4 supports one end of a spring Spr1', Spr2', Spr3', Spr4' respectively, while the other end of said springs rests on one end of the plunger of one of control valves CV1, CV2. Each motion sensor transfers shaft's motion relative the bearing to lever's Lei motion, and "long" arm of said lever controls the tension of spring Spri' influencing the momentary setting of valves CV1, CV2. The equation of instantaneous equilibrium of the plunger PL reads as follows: $p_1 \times A_1+F_1(\beta)+F'_1=p_2 \times A_2+F_3(\beta)+F'_3$, where A1 is the area of the upper surface of bead PL1 of plunger PL, A2 is the area of the lower surface of bead PL2 of plunger PL, $F_1(\beta)$ is the force loading spring Spr1 at the angle $\beta$ of rotation of camshaft CS1, $F_3(\beta)$ is the force loading spring Spr3 at the angle $\beta$ of rotation of camshaft CS3, and $F'_1$ and $F'_3$ are forces loading springs Spr1 and Spr1' respectively. Instantaneous force $F_i(\beta)$ is determined by the radius $r_i(\beta)$, i=1, 3, of cam CSi according to the approximate equation $F(\beta)=-kr_i(\beta)$, where k is the spring constant, while forces $F'_1$ and $F'_3$ are determined by the instantaneous position of the shaft relative bearing's bushing. Therefore valve CV1 gives at its exits S1, resp. S3, substantially the pressure $p_1=p_1(\beta,F'_1,F'_2)$, respectively $p_3=p_3(\beta,F'_1,F'_2)$, where the following equation holds: $p_1-p_3=((F_3(\beta)+F'_3)-(F_1(\beta)+F'_1))/A$, since $A_1=A_2=A$. Similar remarks apply to valve CV2. Parameters of the cams driving both the control valves are chosen as in the previous embodiment. Thus the fluid handling system of the present embodiment generates in-bearing forces balancing the combination of predictable and random forces loading the shaft.

Figure 13:
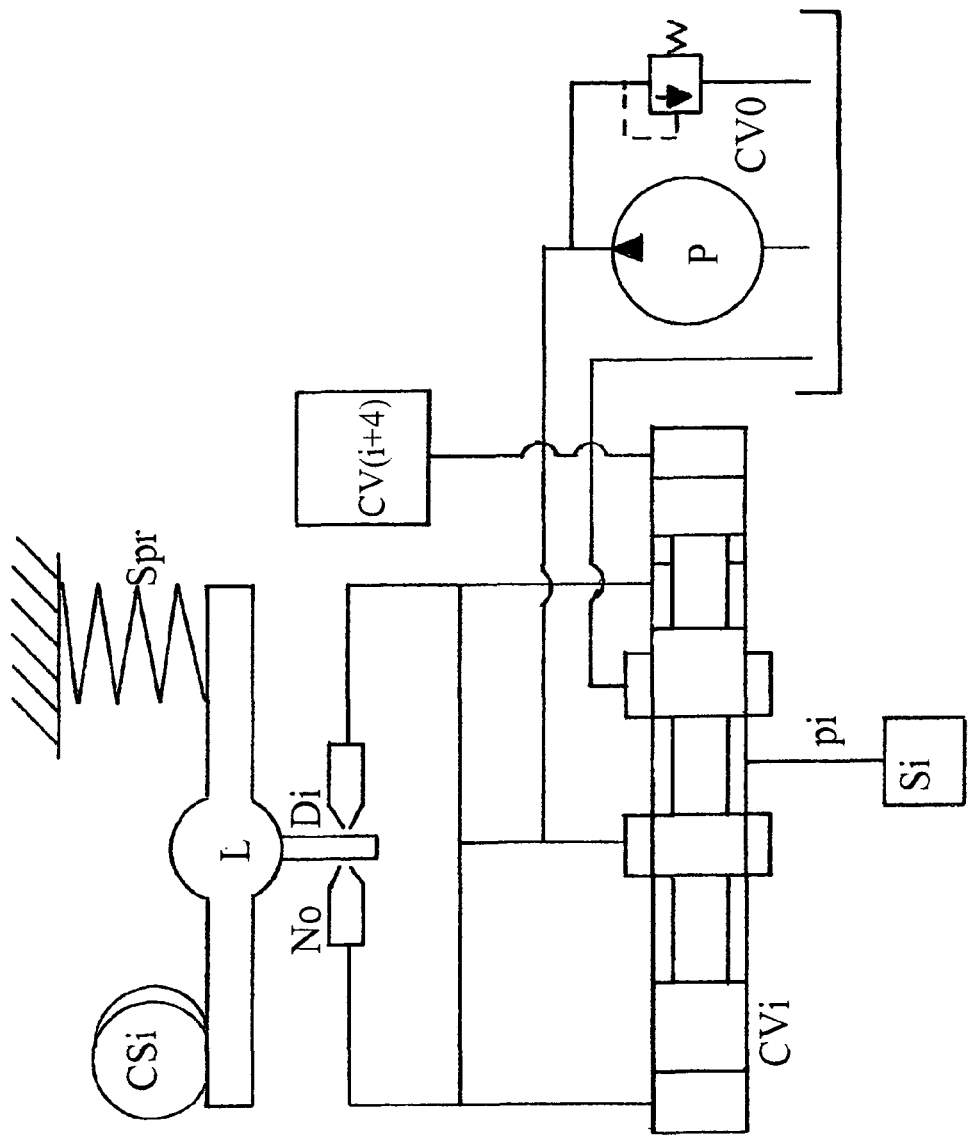
FIG. 13 depicts an alternative device governing the control valves utilized in the fluid handling system in accordance with the present invention.

The control valves CVi in all the embodiments described above are directly governed by cams Csi, and this is the simplest realization of the main idea behind the invention. However, it may be desirable (e.g. in the case of very large bearings) to apply a more elaborate control device governing the control valves. FIG. 13 depicts an alternative device destined to govern the "predictable force" control valves that is within the scope of the present invention. This device employs a well known combination of a diaphragm Di and two nozzles No to generate differential pressures in two hydraulic branches. The incompressible fluid exits said two nozzles at a rate depending on the position of the diaphragm, and the difference of pressures in the two hydraulic branches leading to said nozzles is proportional to the position of the diaphragm. The position of the diaphragm is determined by the position of an anchor L, and the position of the anchor in turn is governed by cam Csi; spring Spr keeps anchor L in permanent contact with cam Csi. Instantaneous displacement of control valve's plunger P1 and pressure pi at the exit of said control valve are proportional to the signal produced by the cam (or, to be more precise, to the distance of the axis of rotation of said cam and the instantaneous point of contact of said cam and said anchor).

Figure 14:
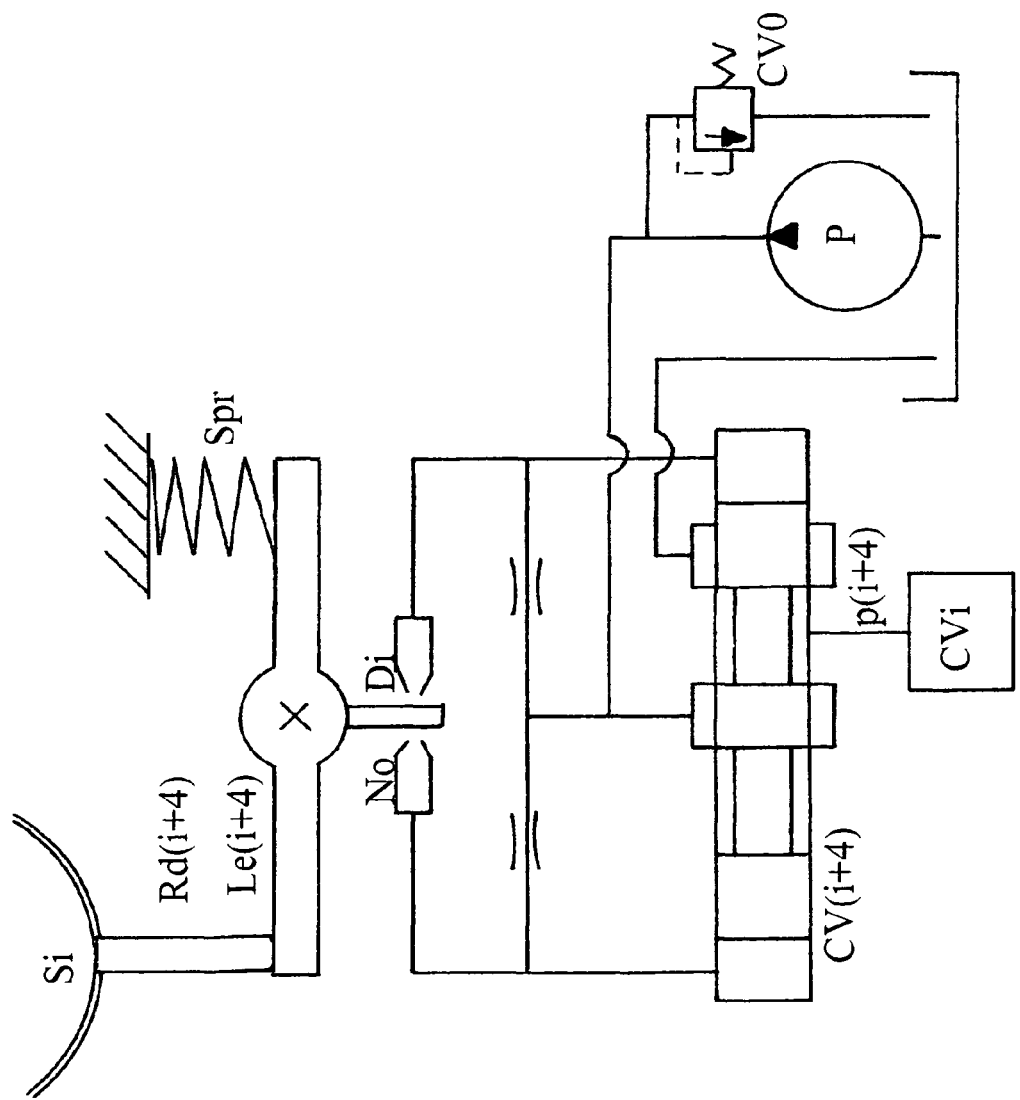
FIG. 14 depicts another device governing the control valves utilized in the fluid handling system in accordance with the present invention.

FIG. 14 illustrates a similar device destined to govern "random force" control valve. It is almost identical to the device described above, the only difference being an alternative method for controlling the position of the anchor. Namely, one end of the anchor is in permanent contact with a rod Rd(i+4) that serves as a shaft position/displacement sensor. Instantaneous displacement of control valve's plunger P1 and pressure pi at the exit of said control valve are proportional to the signal produced by the rod (or, to be more precise, to the displacement of said rod). Otherwise, the whole fluid handling system is the same as in the previously described embodiments. This method for governing the control valves allows for applying smaller cams Csi and more compact fluid handling system.

It is to be stressed that the bearing according to the present invention can serve as a main journal bearing as well as a crank pin or a crosshead bearing.

The foregoing description discloses five preferred embodiments of the invention. One skilled in the art will readily recognize from this description and from the accompanying figures and patent claims, that many changes and modifications can be made to the preferred embodiments without departing from the true spirit, scope and nature of the inventive concepts as defined in the following patent claims.

What I claim is:

1. A hydrostatic bearing system for supporting a shaft of a heat engine by means of a pressurized incompressible fluid, comprising, in combination:

a shaft;

a bearing bushing circumscribing said shaft;

a first hydraulic pocket, a second hydraulic pocket, a third hydraulic pocket, and a fourth hydraulic pocket formed in an inner cylindrical surface of said bearing bushing, wherein the first hydraulic pocket, the second hydraulic pocket, the third hydraulic pocket, and the fourth hydraulic pocket are separated from one another by a first land, a second land, a third land, and a fourth land, to provide hydraulic resistance to flow from one hydraulic pocket to an adjacent hydraulic pocket;

wherein the second hydraulic pocket and the fourth hydraulic pocket are diametrically opposite relative one another thus defining a first axis X, and the first hydraulic pocket and the third hydraulic pocket are diametrically opposite relative one another thus defining a second axis Y, so that the second hydraulic pocket, the fourth hydraulic pocket, the first hydraulic pocket and the third hydraulic pocket define a XY coordinate system;

a first portal means, a second portal means, a third portal means, and a fourth portal means, directed to said first hydraulic pocket, said second hydraulic pocket, said third hydraulic pocket, and said fourth hydraulic pocket respectively;

externally pressurized incompressible fluid passing through the first portal means, the second portal means, the third portal means, and the fourth portal means, and directed to said first hydraulic pocket, said second hydraulic pocket, said third hydraulic pocket, and said fourth hydraulic pocket, respectively;

an incompressible fluid handling system for pressurizing and delivering said incompressible fluid to said first portal means, said second portal means, said third portal means and said fourth portal means, to generate in-bearing forces balancing external forces loading the shaft;

wherein said incompressible fluid handling system includes at least:

a high pressure pump for pressurizing said incompressible fluid;

a pressure reducing valve mounted downstream from the high pressure pump, to provide a constant pressure incompressible fluid flow downstream from said high pressure pump;

a first hydraulic delivery line, a second hydraulic delivery line, a third hydraulic delivery line, and a fourth hydraulic delivery line, placed downstream from said pressure reducing valve, wherein the first hydraulic delivery line, the second hydraulic delivery line, the third hydraulic delivery line, and the fourth hydraulic delivery line provide fluidic communication between said high pressure pump and said first hydraulic pocket, said second hydraulic pocket, said third hydraulic pocket, and said fourth hydraulic pocket, respectively, via said first portal means, said second portal means, said third portal means, and said fourth portal means, respectively;

a first primary plunger control valve having a first inlet port, a first exit port, a first plunger, and a first spring connected with the first plunger; a second primary plunger control valve having a second inlet port, a second exit port, a second plunger, and a second spring connected with the second plunger; a third primary plunger control valve having a third inlet port, a third exit port, a third plunger, and a third spring connected with the third plunger; and a fourth primary plunger control valve having a fourth inlet port, a fourth exit port, a fourth plunger, and a fourth spring connected with the fourth plunger;

wherein the first primary plunger control valve, the second primary plunger control valve, the third primary plunger control valve, and the fourth primary plunger control valve are mounted downstream from said pressure reducing valve; wherein pressure of said incompressible fluid in the first hydraulic delivery line, in the second hydraulic delivery line, in the third hydraulic delivery line, and in the fourth hydraulic delivery line is controlled by said first primary plunger control valve, said second primary plunger control valve, said third primary plunger control valve, and said fourth primary plunger control valve, respectively;

a first cam, a second cam, a third cam, and a fourth cam driven by the engine shaft, wherein the first cam supports the first plunger of the first primary plunger control valve via the first spring, the second cam supports the second plunger of the second primary plunger control valve via the second spring, the third cam supports the third plunger of the third primary plunger control valve via the third spring, and the fourth cam supports the fourth plunger of the fourth primary plunger control valve via the fourth spring;

a first position sensor, a second position sensor, a third position sensor, and a fourth position sensor determining a position of the engine shaft relative said bearing bushing in the XY coordinate system;

a first signal amplifier, a second signal amplifier, a third signal amplifier, and a fourth signal amplifier;

and a first secondary plunger control valve having a fifth inlet port, a fifth exit port, and a fifth plunger; a second secondary plunger control valve having a sixth inlet port, a sixth exit port, and a sixth plunger; a third secondary plunger control valve having a seventh inlet port, a seventh exit port, and a seventh plunger; and a fourth secondary plunger control valve having an eighth inlet port, an eighth exit port, and an eighth plunger;

wherein said first secondary plunger control valve is placed downstream from said pressure reducing valve and upstream relative the first primary plunger control valve, said second secondary plunger control valve is placed downstream from said pressure reducing valve and upstream relative the second primary plunger control valve, said third secondary plunger control valve is placed downstream from said pressure reducing valve and upstream relative the third primary plunger control valve, and said fourth secondary plunger control valve is placed downstream from said pressure reducing valve and upstream relative the fourth primary plunger control valve;

wherein said first signal amplifier, said second signal amplifier, said third signal amplifier, and said fourth signal amplifier, receive signals from the first position sensor, the second position sensor, the third position sensor, and the fourth position sensor respectively, and exert force on the fifth plunger of said first secondary plunger control valve, the sixth plunger of said second secondary plunger control valve, the seventh plunger of said third secondary plunger control valve, and the eighth plunger of said fourth secondary plunger control valve, respectively, so that the momentary pressure of said incompressible fluid at the fifth exit port of said first secondary plunger control valve, the sixth exit port of said second secondary plunger control valve, the seventh exit port of said third secondary plunger control valve, and the eighth exit port of said fourth secondary plunger control valve encodes the components in the XY coordinate system of a random force loading said bearing bushing;

wherein said fifth exit port of the first secondary plunger control valve, said sixth exit port of the second secondary plunger control valve, said seventh exit port of the third secondary plunger control valve, and said eighth exit port of the fourth secondary plunger control valve are in fluidic communication with said first inlet port of said first primary plunger control valve, said second inlet port of said second primary plunger control valve, said third inlet port of said third primary plunger control valve, and said fourth inlet port of said fourth primary plunger control valve respectively, so that the pressure of said incompressible fluid at the fifth exit port of said first secondary plunger control valve, the sixth exit port of said second secondary plunger control valve, the seventh exit port of said third secondary plunger control valve, and the eighth exit port of said fourth secondary plunger control valve provides a correction signal to said first primary plunger control valve, said second primary plunger control valve, said third primary plunger control valve, and said fourth primary plunger control valve, respectively;

wherein profiles of the first cam, the second cam, the third cam, and the fourth cam in a polar coordinate system $(r,\phi)$ are given by convex functions $r_1(\phi-\phi_1)=C_1F_1(\phi)$, $r_2(\phi-\phi_2)=C_2F_2(\phi)$, $r_3(\phi-\phi_3)=C_3F_3(\phi)$, $r_4(\phi-\phi_4)=C_4F_4(\phi)$ respectively;

wherein $F(\phi)$ is a predetermined resultant force loading the bearing bushing being the sum of a mass force $F_M(\phi)$, and a gas force $F_G(\phi)$; wherein $F(\phi)=F_X(\phi)+F_Y(\phi)$ is a decomposition of the resultant force $F(\phi)$ in the XY coordinate system into X –component $F_X(\phi)$ and Y –component $F_Y(\phi)$ ; wherein all the forces $F(\phi)$, $F_M(\phi)$, $F_G(\phi)$, $F_X(\phi)$, $F_Y(\phi)$ are functions of the angle $\phi$ of rotation of the engine shaft; wherein $F_X(\phi)=F_2(\phi)-F_4(\phi)$ is a decomposition of the function $F_X(\phi)$ into two convex functions $F_2(\phi)$ and $F_4(\phi)$ of the angle $\phi$ of rotation of the engine shaft, and $F_Y(\phi)=F_1(\phi)-F_3(\phi)$ is a decomposition of the function Fy($\phi$) into two convex functions $F_1(\phi)$ and $F_3(\phi)$ of the angle $\phi$ of rotation of the engine shaft;

wherein C1, C2, C3, C4 are predetermined constants, and ($\phi_1$, $\phi_2$, $\phi_3$, $\phi_4$ are predetermined phases;

wherein the pressure of said incompressible fluid at the first exit port of said first primary plunger control valve, the second exit port of said second primary plunger control valve, the third exit port of said third primary plunger control valve, and the fourth exit port of said fourth primary plunger control valve encodes the function $F_1(\phi)$, $F_2(\phi)$, $F_3(\phi)$ $F_4(\phi)$, respectively;

wherein the momentary position of said first cam, said second cam, said third cam, and said fourth cam, together with the pressure of said incompressible fluid at the fifth exit port of said first secondary plunger control valve, the sixth exit port of said second secondary plunger control valve, the seventh exit port of said third secondary plunger control valve, and the eighth exit port of said fourth secondary plunger control valve respectively, determine momentary forces loading the first plunger of said first primary plunger control valve, the second plunger of said second primary plunger control valve, the third plunger of said third primary plunger control valve and the fourth plunger of said fourth primary plunger control valve respectively, and the pressure of said incompressible fluid at the first exit port of said first primary plunger control valve, the second exit port of said second primary plunger control valve, the third exit port of said third primary plunger control valve, and at the fourth exit port of said fourth primary plunger control valve, respectively, and thus the pressure of said incompressible fluid in said first hydraulic delivery line, said first portal means and said first hydraulic pocket, said second hydraulic delivery line, said second portal means and said second hydraulic pocket, said third hydraulic delivery line, said third portal means and said third hydraulic pocket, and said fourth hydraulic delivery line, said fourth portal means and said fourth hydraulic pocket respectively, thus generating in-bearing hydraulic forces balancing external forces loading the bearing bushing.

2. A hydrostatic bearing system for supporting a shaft of a heat engine by means of a pressurized incompressible fluid, comprising, in combination:

a shaft;

a bearing bushing circumscribing said shaft;

a first hydraulic pocket, a second hydraulic pocket, a third hydraulic pocket, and a fourth hydraulic pocket formed in an inner cylindrical surface of said bearing bushing, wherein the first hydraulic pocket, the second hydraulic pocket, the third hydraulic pocket, and the fourth hydraulic pocket are separated from one another by a first land, a second land, a third land, and a fourth land, to provide hydraulic resistance to flow from one hydraulic pocket to an adjacent hydraulic pocket;

wherein the second hydraulic pocket and the fourth hydraulic pocket are diametrically opposite relative one another thus defining a first axis X, and the first hydraulic pocket and the third hydraulic pocket are diametrically opposite relative one another thus defining a second axis Y, so that the second hydraulic pocket, the fourth hydraulic pocket, the first hydraulic pocket, and the third hydraulic pocket define a XY coordinate system;

a first portal means, a second portal means, a third portal means, and a fourth portal means directed to said first hydraulic pocket, said second hydraulic pocket, said third hydraulic pocket, and said fourth hydraulic pocket, respectively;

externally pressurized incompressible fluid passing through the first portal means, the second portal means, the third portal means, and the fourth portal means, and directed to said first hydraulic pocket, said second hydraulic pocket, said third hydraulic pocket, and said fourth hydraulic pocket, respectively;

an incompressible fluid handling system for pressurizing and delivering said incompressible fluid to said first portal means, said second portal means, said third portal means, and said fourth portal means, to generate in-bearing forces balancing external forces loading the shaft;

wherein said incompressible fluid handling system includes at least:

a high pressure pump for pressurizing said incompressible fluid;

a pressure reducing valve mounted downstream from the high pressure pump, to provide a constant pressure incompressible fluid flow downstream from said high pressure pump;

a first hydraulic delivery line, a second hydraulic delivery line, a third hydraulic delivery line, and a fourth hydraulic delivery line, placed downstream from said pressure reducing valve, wherein the first hydraulic delivery line, the second hydraulic delivery line, the third hydraulic delivery line, and the fourth hydraulic delivery line provide fluidic communication between said high pressure pump and said first hydraulic pocket, said second hydraulic pocket, said third hydraulic pocket, and said fourth hydraulic pocket, respectively, via said first portal means, said second portal means, said third portal means, and said fourth portal means, respectively;

a first primary plunger control valve having a first inlet port, a first exit port, a first plunger, and a first spring connected with the first plunger; a second primary plunger control valve having a second inlet port, a second exit port, a second plunger, and a second spring connected with the second plunger; a third primary plunger control valve having a third inlet port, a third exit port, a third plunger, and a third spring connected with the third plunger; and a fourth primary plunger control valve having a fourth inlet port, a fourth exit port, a fourth plunger, and a fourth spring connected with the fourth plunger; wherein the first primary plunger control valve, the second primary plunger control valve, the third primary plunger control valve, and the fourth primary plunger control valve are mounted downstream from said pressure reducing valve; wherein pressure of said incompressible fluid in the first hydraulic delivery line, in the second hydraulic delivery line, in the third hydraulic delivery line, and in the fourth hydraulic delivery line is controlled by said first primary plunger control valve, said second primary plunger control valve, said third primary plunger control valve, and said fourth primary plunger control valve, respectively;

a first primary cam, a second primary cam, a third primary cam, and a fourth primary cam driven by the engine shaft, wherein the first primary cam supports the first plunger of the first primary plunger control valve via the first spring, the second primary cam supports the second plunger of the second primary plunger control valve via the second spring, the third primary cam supports the third plunger of the third primary plunger control valve via the third spring, and the fourth primary cam supports the fourth plunger of the fourth primary plunger control valve via the fourth spring;

a first secondary plunger control valve having a fifth inlet port, a fifth exit port, a fifth plunger, and a fifth spring connected with the fifth plunger; a second secondary plunger control valve having a sixth inlet port, a sixth exit port, a sixth plunger, and a sixth spring connected with the sixth plunger; a third secondary plunger control valve having a seventh inlet port, a seventh exit port, a seventh plunger, and a seventh spring connected with the seventh plunger; and a fourth secondary plunger control valve having an eighth inlet port, an eighth exit port, an eighth plunger, and an eighth spring connected with the eighth plunger; wherein the first secondary plunger control valve, the second secondary plunger control valve, the third secondary plunger control valve, and the fourth secondary plunger control valve are mounted downstream from said pressure reducing valve and upstream relative said first primary plunger control valve, said second primary plunger control valve, said third primary plunger control valve, and said fourth primary plunger control valve, respectively;

a first secondary cam, a second secondary cam, a third secondary cam, and a fourth secondary cam driven by the engine shaft and supporting the fifth plunger of the first secondary plunger control valve via the fifth spring, the sixth plunger of the second secondary plunger control valve via the sixth spring, the seventh plunger of the third secondary plunger control valve via the seventh spring, and the eighth plunger of the fourth secondary plunger control valve via the eighth spring, respectively;

wherein said fifth exit port of the first secondary plunger control valve, said sixth exit port of the second secondary plunger control valve, said seventh exit port of the third secondary plunger control valve, and said eighth exit port of the fourth secondary plunger control valve are in fluidic communication with said first inlet port of said first primary plunger control valve, said second inlet port of said second primary plunger control valve, said third inlet port of said third primary plunger control valve, and said fourth inlet port of said fourth primary plunger control valve, respectively, so that the pressure of said incompressible fluid at the fifth exit port of said first secondary plunger control valve, the sixth exit port of said second secondary plunger control valve, the seventh exit port of said third secondary plunger control valve, and the eighth exit port of said fourth secondary plunger control valve, provides a correction signal to said first primary plunger control valve, said second primary plunger control valve, said third primary plunger control valve, and said fourth primary plunger control valve, respectively;

wherein profiles of the first primary cam, the second primary cam, the third primary cam, and the fourth primary cam in a polar coordinate system $(r,\phi)$ are given by convex functions $r_1(\phi-\phi_1)=C_1F_1(\phi)$, $r_2(\phi-\phi_2)=C_2F_2(\phi)$, $r_3(\phi-\phi_3)=-C_3F_3(\phi)$, $r_4(\phi-\phi_4)=C_4 F_4(\phi)$ respectively;

wherein profiles of the first secondary cam, the second secondary cam, the third secondary cam, and the fourth secondary cam in the polar coordinate system $(r,\phi)$ are given by convex functions $r_5(\phi-\phi_5)=C_5F_5(\phi)$, $r_6(\phi-\phi_6)=C_6F_6(\phi)$, $r_7(\phi-\phi_7)=C_7F_7(\phi)$, $r_8(\phi-\phi_8)=C_8 F_8(\phi)$ respectively;

wherein $F(\phi)$ is a predetermined resultant force loading the bearing bushing being the sum of a mass force $F_M(\phi)$ and a gas force $F_G(\phi)$, wherein all the forces $F(\phi)$, $F_M(\phi)$, $F_G(\phi)$, $F_x(\phi)$, $F_y(\phi)$ are functions of the angle $\phi$ of rotation of the engine shaft;

wherein $F_M(\phi)=F_{MX}(\phi)+F_{MY}(\phi)$ is a decomposition of the mass force $F_M(\phi)$ in the XY coordinate system into X-component $F_{MX}(\phi)$, and Y-component $F_{MY}(\phi)$;

wherein $F_{MX}(\phi)=F_2(\phi)-F_4(\phi)$ is a decomposition of the function $F_{MX}$ into two convex functions $F_2(\phi)$ and $F_4(\phi)$ of the angle $\phi$ of rotation of the engine shaft;

wherein $F_{MY}(\phi)=F_1(\phi)-F_3(\phi)$ is a decomposition of the function $F_{MY}$ into two convex functions $F_1(\phi)$ and $F_3(\phi)$ of the angle $\phi$ of rotation of the engine shaft;

wherein $F_G(\phi)=F_{GX}(\phi)+F_{GY}(\phi)$ is a decomposition of the gas force $F_G(\phi)$ in the XY coordinate system into X-component $F_{GX}(\phi)$ and Y-component $F_{GY}(\phi)$;

wherein $F_{GX}(\phi)=F_6(\phi)-F_8(\phi)$ is a decomposition of the function $F_{GX}$ into two convex functions $F_6(\phi)$ and $F_8(\phi)$ of the angle $\phi$ of rotation of the engine shaft;

wherein $F_{GY}(\phi)=F_5(\phi)-F_7(\phi)$ is a decomposition of the function $F_{GY}$ into two convex functions $F_5(\phi)$ and $F_7(\phi)$ of the angle $\phi$ of rotation of the engine shaft;

wherein C1, C2, C3, C4, C5, C6, C7, and C8 are predetermined constants, and $\phi_3$, $\phi_4$, $\phi_5$, $\phi_6$, $\phi_7$, and $\phi_8$ are predetermined phases, wherein the momentary position of said first primary cam, said second primary cam, said third primary cam, and said fourth primary cam, together with the pressure of said incompressible fluid at the fifth exit port of said first secondary plunger control valve, the sixth exit port of said second secondary plunger control valve, the seventh exit port of said third secondary plunger control valve, and the eighth exit port of said fourth secondary plunger control valve respectively determines momentary force loading the first plunger of said first primary plunger control valve, the second plunger of said second primary plunger control valve, the third plunger of said third primary plunger control valve, and the fourth plunger of said fourth primary plunger control valve respectively, and thus the pressure of said incompressible fluid at the first exit port of said first primary plunger control valve, the second exit port of said second primary plunger control valve, the third exit port of said third primary plunger control valve, and at the fourth exit port of said fourth primary plunger control valve, respectively, and thus the pressure of said incompressible fluid in said first hydraulic delivery line, said first portal means, and said first hydraulic pocket, said second hydraulic delivery line, said second portal means, and said second hydraulic pocket, said third hydraulic delivery line, said third portal means, and said third hydraulic pocket, and said fourth hydraulic delivery line, said fourth portal means, and said fourth hydraulic pocket, respectively, thus generating in-bearing hydraulic forces balancing external forces loading the bearing bushing.

3. A hydrostatic bearing system for supporting a shaft of a heat engine by means of a pressurized incompressible fluid, comprising, in combination:

a shaft;

a bearing bushing circumscribing said shaft;

a first hydraulic pocket, a second hydraulic pocket, a third hydraulic pocket, and a fourth hydraulic pocket formed in an inner cylindrical surface of said bearing bushing, wherein the first hydraulic pocket, the second hydraulic pocket, the third hydraulic pocket, and the fourth hydraulic pocket are separated from one another by a first land, a second land, a third land, and a fourth land, to provide hydraulic resistance to flow from one hydraulic pocket to an adjacent hydraulic pocket;

wherein the second hydraulic pocket and the fourth hydraulic pocket are diametrically opposite relative one another thus defining a first axis X, and the first hydraulic pocket and the third hydraulic pocket are diametrically opposite relative one another thus defining a second axis Y, so that the second hydraulic pocket, the fourth hydraulic pocket, the first hydraulic pocket and the third hydraulic pocket define a XY coordinate system;

a first portal means, a second portal means, a third portal means, and a fourth portal means directed to said first hydraulic pocket, said second hydraulic pocket, said third hydraulic pocket, and said fourth hydraulic pocket, respectively;

externally pressurized incompressible fluid passing through the first portal means, the second portal means, the third portal means, and the fourth portal means, and directed to said first hydraulic pocket, said second hydraulic pocket, said third hydraulic pocket, and said fourth hydraulic pocket, respectively;

an incompressible fluid handling system for pressurizing and delivering said incompressible fluid to said first portal means, said second portal means, said third portal means, and said fourth portal means, to generate in-bearing forces balancing external forces loading the shaft;

wherein said incompressible fluid handling system includes at least:

a high pressure pump for pressurizing said incompressible fluid;

a pressure reducing valve mounted downstream from the high pressure pump to provide a constant pressure incompressible fluid flow downstream from said high pressure pump;

a first hydraulic delivery line, a second hydraulic delivery line, a third hydraulic delivery line, and a fourth hydraulic delivery line placed downstream from said pressure reducing valve, wherein the first hydraulic delivery line, the second hydraulic delivery line, the third hydraulic delivery line, and the fourth hydraulic delivery line provide fluidic communication between said high pressure pump and said first hydraulic pocket, said second hydraulic pocket, said third hydraulic pocket, and said fourth hydraulic pocket, respectively, via said first portal means, said second portal means, said third portal means, and said fourth portal means, respectively;

a first constant differential pressure plunger control valve having a first inlet port, a first exit port, a second exit port, a first plunger, and a first spring and a second spring;

wherein the first plunger has a first end and a second end, wherein the first spring is connected with the first end of the first plunger, and the second spring is connected with the second end of the first plunger;

a second constant differential pressure plunger control valve, having a second inlet port, a third exit port, a fourth exit port, a second plunger, and a third spring and a fourth spring; wherein the second plunger has a third end and a fourth end, wherein the third spring is connected with the third end of the second plunger, and the fourth spring is connected with the fourth end of the second plunger;

wherein the first constant differential pressure plunger control valve and the second constant differential pressure plunger control valve are mounted downstream from said pressure reducing valve;

wherein the first exit port of the first constant differential pressure plunger control valve is in fluidic communication with the first hydraulic delivery line, and the second exit port of the first constant differential pressure plunger control valve is in fluidic communication with the third hydraulic delivery line, so that pressure of said incompressible fluid in the first hydraulic delivery line and the third hydraulic delivery line is controlled by said first constant differential pressure plunger control valve;

wherein the third exit port of the second constant differential pressure plunger control valve is in fluidic communication with the second hydraulic delivery line, and the fourth exit port of the second constant differential pressure plunger control valve is in fluidic communication with the fourth hydraulic delivery line, so that pressure of said incompressible fluid in the second hydraulic delivery line and the fourth hydraulic delivery line is controlled by said second constant differential pressure plunger control valve;

a first cam, a second cam, a third cam, and a fourth cam driven by the engine shaft;

wherein the first cam supports the first plunger of the first constant differential pressure plunger control valve via the first spring at the first end of said first plunger, and the third cam supports the first plunger of the first constant differential pressure plunger control valve via the second spring at the second end of said first plunger;

wherein the second cam supports the second plunger of the second constant differential pressure plunger control valve via the third spring at the third end of said second plunger, and the fourth cam supports the second plunger of the second constant differential pressure plunger control valve via the fourth spring at the fourth end of said second plunger;

wherein profiles of the first cam, the second cam, the third cam, and the fourth cam in a polar coordinate system $(r,\phi)$ are given by convex functions $r_1(\phi-\phi_1)=C_1F_1(\phi)$, $r_2(\phi-\phi_2)=C_2F_2(\phi)$, $r_3(\phi-\phi_3)=C_3F_3(\phi)$, $r_4(\phi-\phi_4)=C_4F_4(\phi)$, respectively;

wherein $F(\phi)$ is a predetermined resultant force loading the engine bearing bushing being the sum of a mass force $F_M(\phi)$ and a gas force $F_G(\phi)$, $F(\phi)=F_X(\phi)+F_Y(\phi)$ is a decomposition of the predetermined resultant force $F(\phi)$ in the XY coordinate system into X-component $F_X(\phi)$ and Y-component $F_Y(\phi)$, wherein all the forces $F(\phi)$, $F_M(\phi), F_G(\phi), F_X(\phi), F_Y(\phi)$ are functions of the angle $\phi$ of rotation of the engine shaft;

wherein $F_X(\phi)=F_2(\phi)-F_4(\phi)$ is a decomposition of the function $F_X$ into two convex functions $F_2(\phi)$ and $F_4(\phi)$ of the angle $\phi$ of rotation of the engine shaft, and $F_Y(\phi)=F_1(\phi)-F_3(\phi)$ is a decomposition of the function $F_Y(\phi)$ into two convex functions $F_1(\phi)$ and $F_3(\phi)$ of the angle $\phi$ of rotation of the engine shaft;

wherein C1, C2, C3, C4 are predetermined constants, and $\phi_1, \phi_2, \phi_3, \phi_4$ are predetermined phases;

wherein the pressure of said incompressible fluid at the first exit port of the first constant differential pressure plunger control valve encodes the function $F_1(\phi)$, and the pressure of said incompressible fluid at the second exit port of the first constant differential pressure plunger control valve encodes the function $F_3(\phi)$;

wherein the pressure of said incompressible fluid at the third exit port of the second constant differential pressure plunger control valve encodes the function $F_2(\phi)$, and the pressure of said incompressible fluid at the fourth exit port of the second constant differential pressure plunger control valve encodes the function $F_4(\phi)$;

wherein momentary positions of the first cam and the third cam determine momentary resultant force loading the first plunger of said first constant differential pressure plunger control valve, thus determining the pressure of said incompressible fluid at the first exit port and the second exit port of said first constant differential pressure plunger control valve, and thus the pressure of said incompressible fluid in said first hydraulic delivery line, and said third hydraulic delivery line, the first portal means and the third portal means, and said first hydraulic pocket and said third hydraulic pocket;

wherein momentary positions of the second cam, and the fourth cam determine momentary resultant force loading the second plunger of said second constant differential pressure plunger control valve, thus determining the pressure of said incompressible fluid at the third exit port and the fourth exit port of said second constant differential pressure plunger control valve, and thus the pressure of said incompressible fluid in said second hydraulic delivery line, and said fourth hydraulic delivery line, the second portal means and the fourth portal means, and said second hydraulic pocket and said fourth hydraulic pocket, thus generating in-bearing hydraulic forces balancing external forces loading the bearing bushing.

4. The hydrostatic bearing system for supporting a shaft of a heat engine by means of a pressurized incompressible fluid according to claim 3, wherein said incompressible fluid handling system includes:

a first position sensor, a second position sensor, a third position sensor, and a fourth position sensor determining a momentary position of the engine shaft relative said bearing bushing in the XY coordinate system;

a first signal amplifier, a second signal amplifier, a third signal amplifier, and a fourth signal amplifier;

wherein said first signal amplifier receives signals from the first position sensor and exerts force on the first end of the first plunger of said first constant differential pressure plunger control valve via a fifth spring, and said third signal amplifier receives signals from the third position sensor and exerts force on the second end of the first plunger of said first constant differential pressure plunger control valve via a sixth spring;

wherein the first signal amplifier and the third signal amplifier provide a correction signal to the first constant differential pressure plunger control valve encoding the Y-component in the XY coordinate system of a random force loading the bearing bushing;

wherein said second signal amplifier receives signals from the second position sensor and exerts force on the third end of the second plunger of said second constant differential pressure plunger control valve via a seventh spring, and said fourth signal amplifier receives signals from the fourth position sensor and exerts force on the fourth end of the second plunger of said second constant differential pressure plunger control valve via an eighth spring;

wherein the second signal amplifier and the fourth signal amplifier provide a correction signal to the second constant differential pressure plunger control valve encoding the X– component in the XY coordinate system of a random force loading the bearing bushing.

* * * * *